United States Patent
Hirai et al.

(10) Patent No.: US 11,667,142 B2
(45) Date of Patent: Jun. 6, 2023

(54) REVERSIBLE RECORDING MEDIUM AND EXTERIOR MEMBER

(71) Applicant: Sony Corporation, Tokyo (JP)

(72) Inventors: Nobukazu Hirai, Kanagawa (JP); Yuriko Kaino, Kanagawa (JP); Kenji Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 16/772,373

(22) PCT Filed: Dec. 20, 2018

(86) PCT No.: PCT/JP2018/046977
§ 371 (c)(1),
(2) Date: Jun. 12, 2020

(87) PCT Pub. No.: WO2019/124491
PCT Pub. Date: Jun. 27, 2019

(65) Prior Publication Data
US 2021/0078348 A1 Mar. 18, 2021

(30) Foreign Application Priority Data
Dec. 20, 2017 (JP) .............................. JP2017-243581

(51) Int. Cl.
*B41M 5/42* (2006.01)
*B41M 5/34* (2006.01)
*B41M 5/30* (2006.01)

(52) U.S. Cl.
CPC .............. *B41M 5/42* (2013.01); *B41M 5/305* (2013.01); *B41M 5/34* (2013.01);
(Continued)

(58) Field of Classification Search
CPC .......... B41M 5/305; B41M 5/34; B41M 5/42; B41M 5/44; B41M 5/465; B41M 2205/04; B41M 2205/38; B41M 2205/42
See application file for complete search history.

(56) References Cited

U.S. PATENT DOCUMENTS

| 5,552,364 A | 9/1996 | Tsutsui et al. |
| 2006/0276335 A1 | 12/2006 | Tsuboi et al. |
| 2015/0277221 A1 | 10/2015 | Gevaert |

FOREIGN PATENT DOCUMENTS

| CN | 102821966 A | 12/2012 |
| JP | 06-079970 | 3/1994 |

(Continued)

OTHER PUBLICATIONS

Matweb.com material data for polycarbonate. Acquired from https://www.matweb.com/search/DataSheet.aspx?MatGUID=84b257896b674f93a39596d00d999d77 on Sep. 20, 2022.*

(Continued)

*Primary Examiner* — Gerard Higgins
(74) *Attorney, Agent, or Firm* — K&L Gates LLP

(57) ABSTRACT

A reversible recording medium according to an embodiment of the present disclosure includes a first recording layer to be colored in a first color, a second recording layer to be colored in a second color, the second color being different from the first color, and a first intermediate layer provided between the first recording layer and the second recording layer, the first intermediate layer including a plurality of layers respectively containing materials different from each other.

11 Claims, 15 Drawing Sheets

(52) U.S. Cl.
CPC ..... *B41M 2205/04* (2013.01); *B41M 2205/38* (2013.01); *B41M 2205/42* (2013.01)

(56) References Cited

FOREIGN PATENT DOCUMENTS

| | | |
|---|---|---|
| JP | 06-305247 | 11/1994 |
| JP | 08-267924 | 10/1996 |
| JP | 2001-001645 | 1/2001 |
| JP | 2003-112473 | 4/2003 |
| JP | 2004-155010 | 6/2004 |
| JP | 2005-066936 | 3/2005 |
| JP | 2005-144953 | 6/2005 |
| JP | 2007-098735 | 4/2007 |

OTHER PUBLICATIONS

Matweb.com material data for PET. Acquired from https://www.matweb.com/search/datasheettext.aspx?matguid=a696bdcdff6f41dd98f8eec3599eaa20 on Sep. 20, 2022.*
Polyethersulfone supplier data from Azo Materials. Acquired from https://www.azom.com/article.aspx?ArticleID=1953 on Sep. 20, 2022.*
International Search Report issued in Application No. PCT/JP2018/046977, dated Mar. 12, 2019.

* cited by examiner

[FIG. 1]
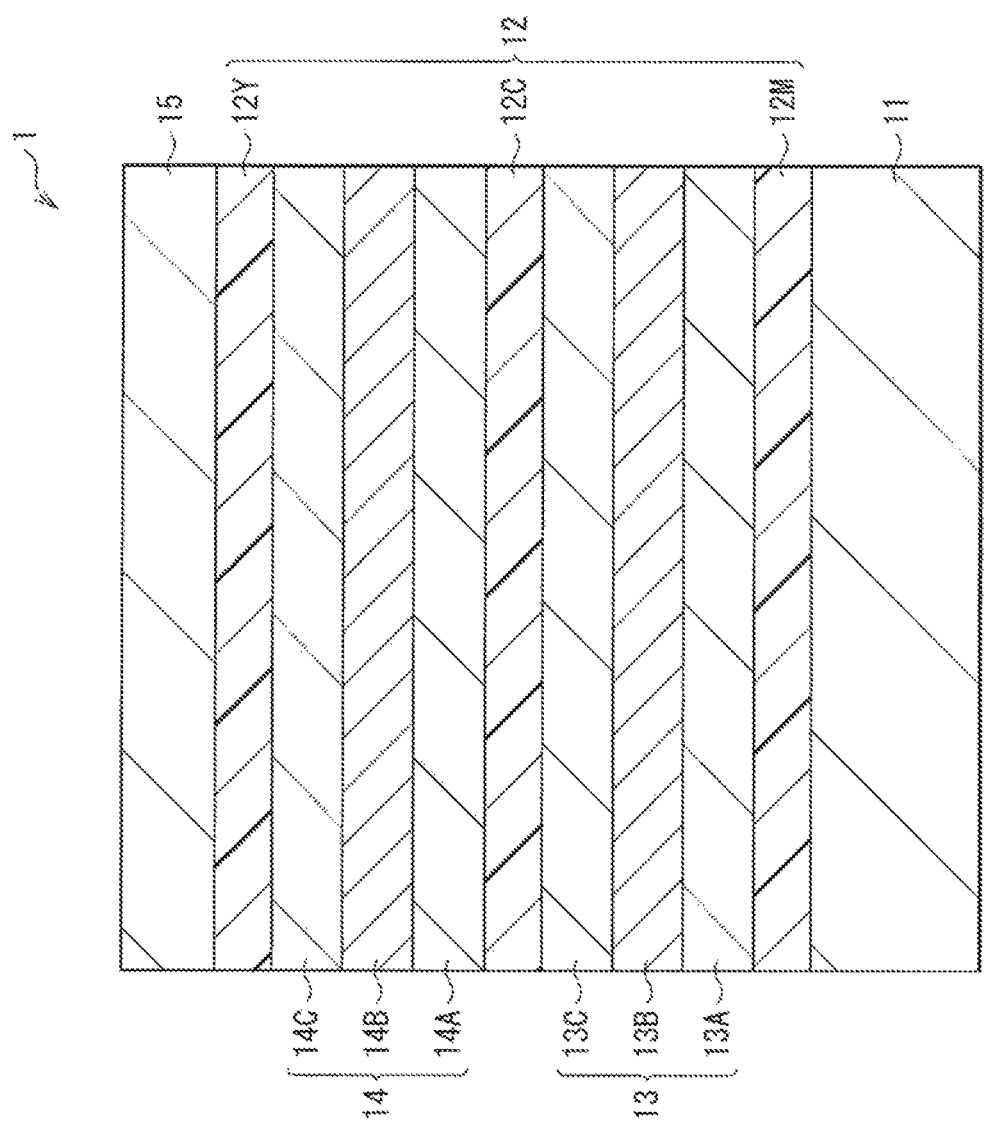

[FIG. 2]
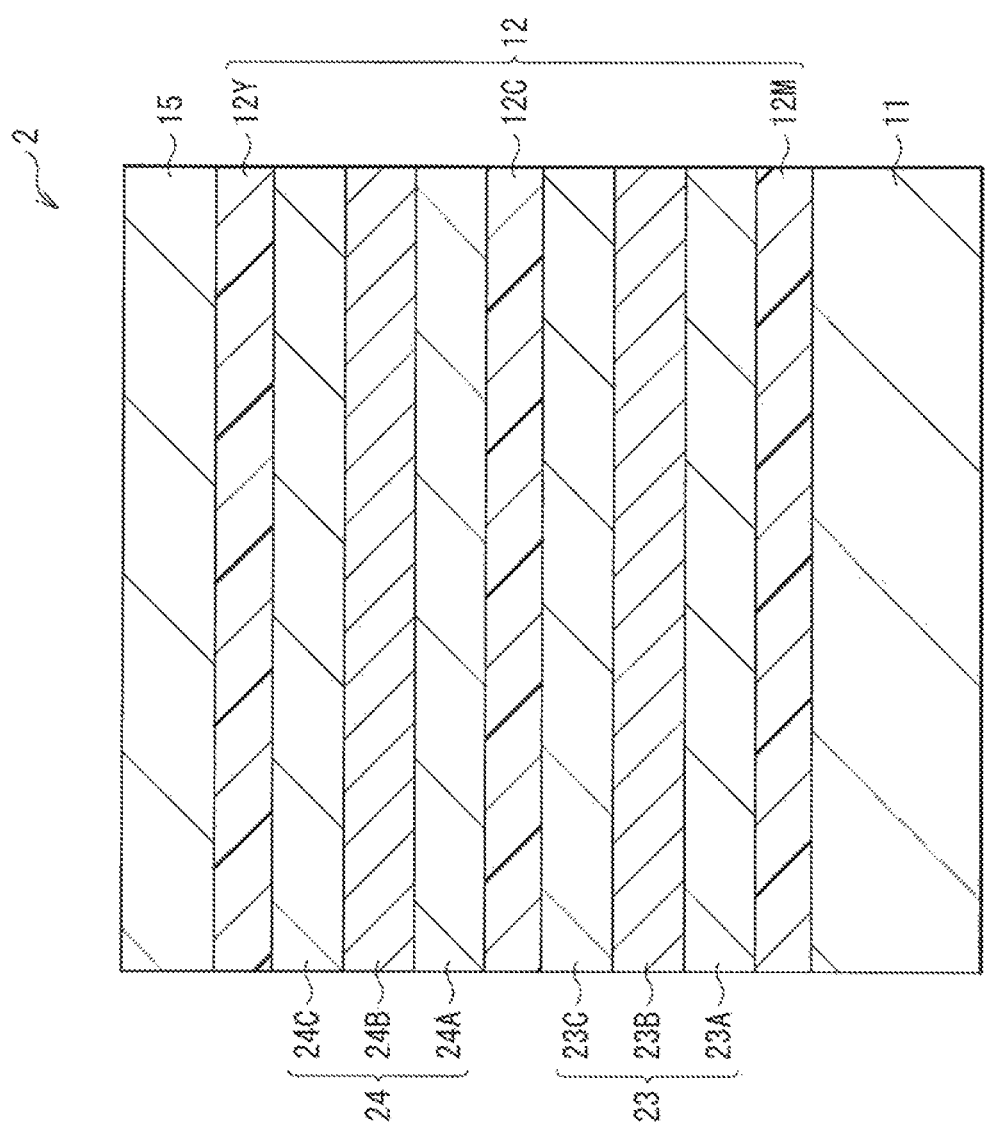

[FIG. 3]
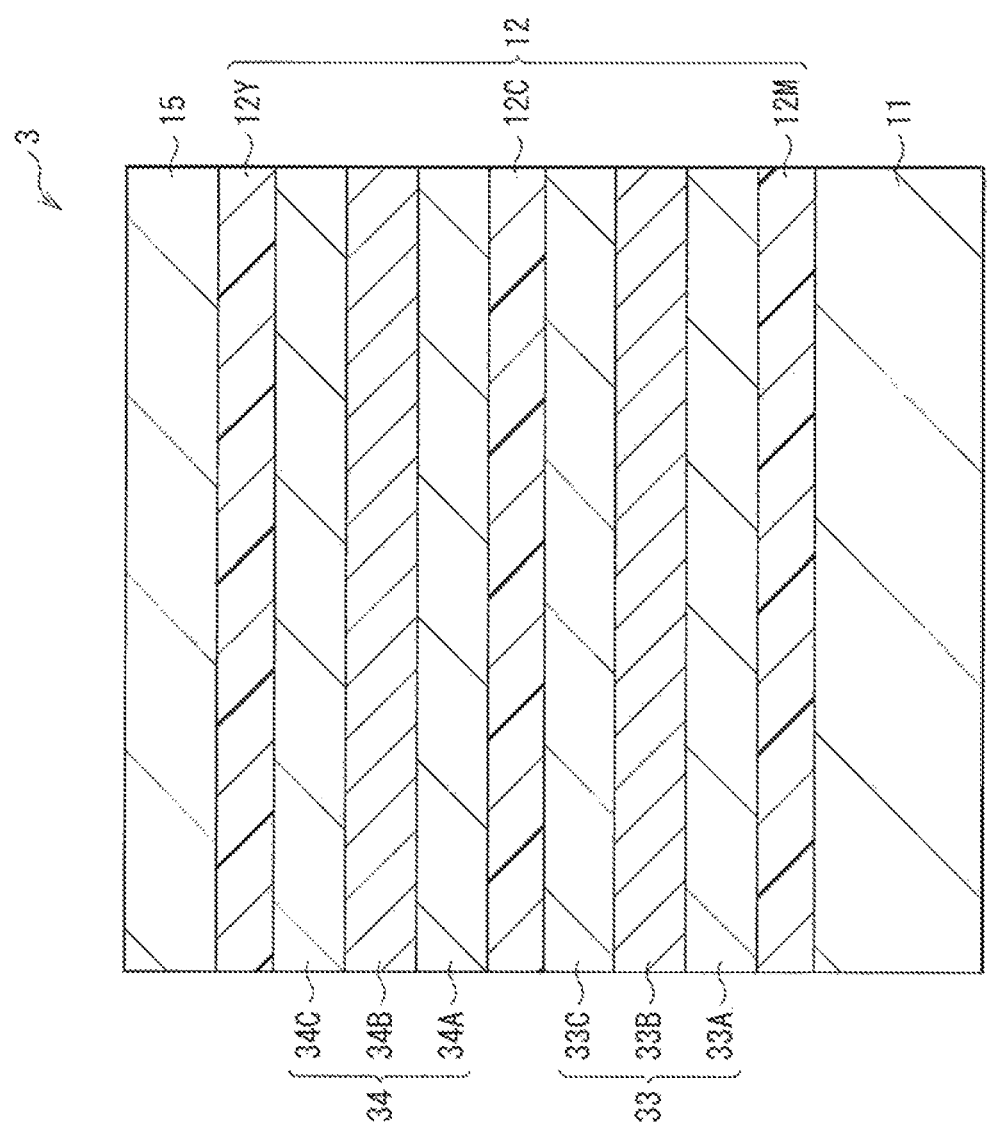

[FIG. 4]
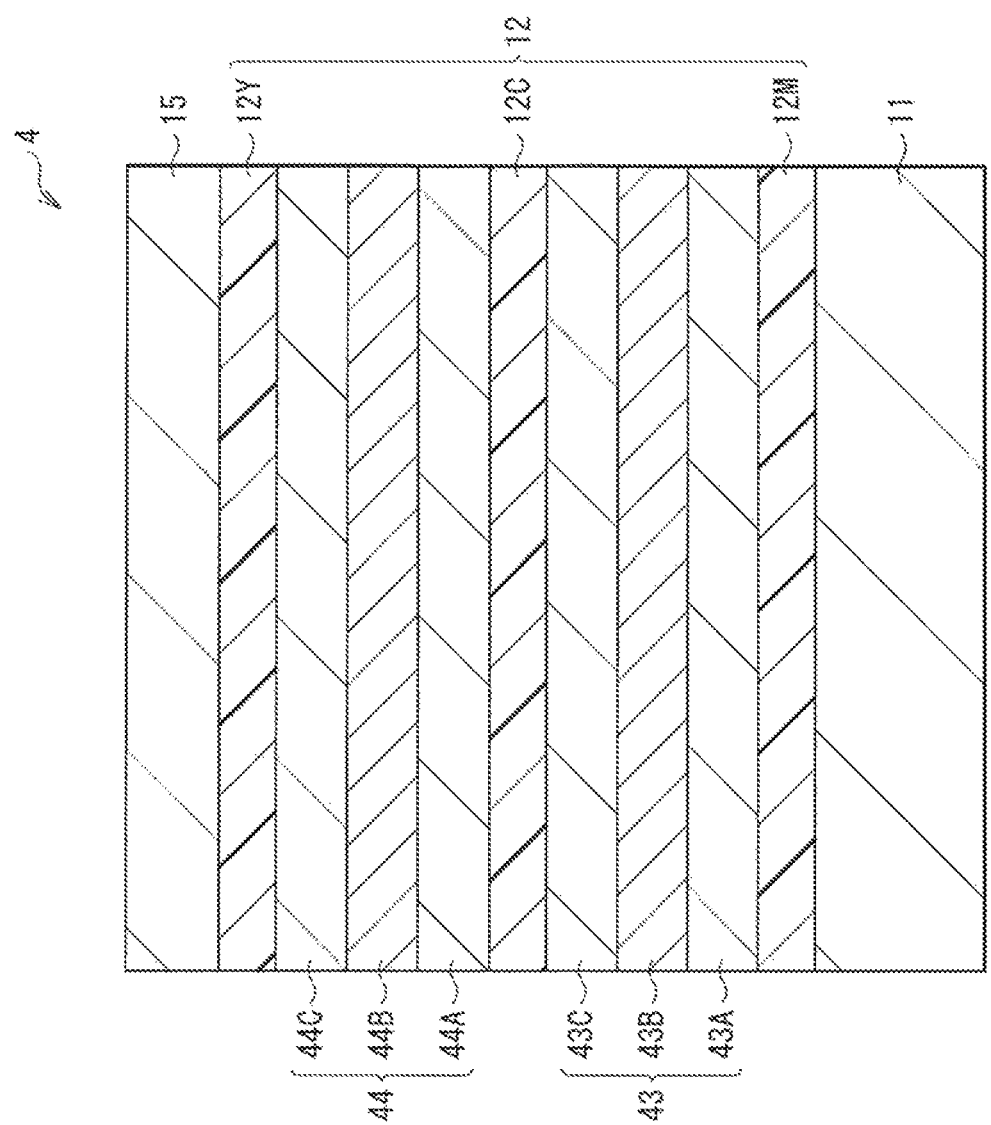

[FIG. 5]
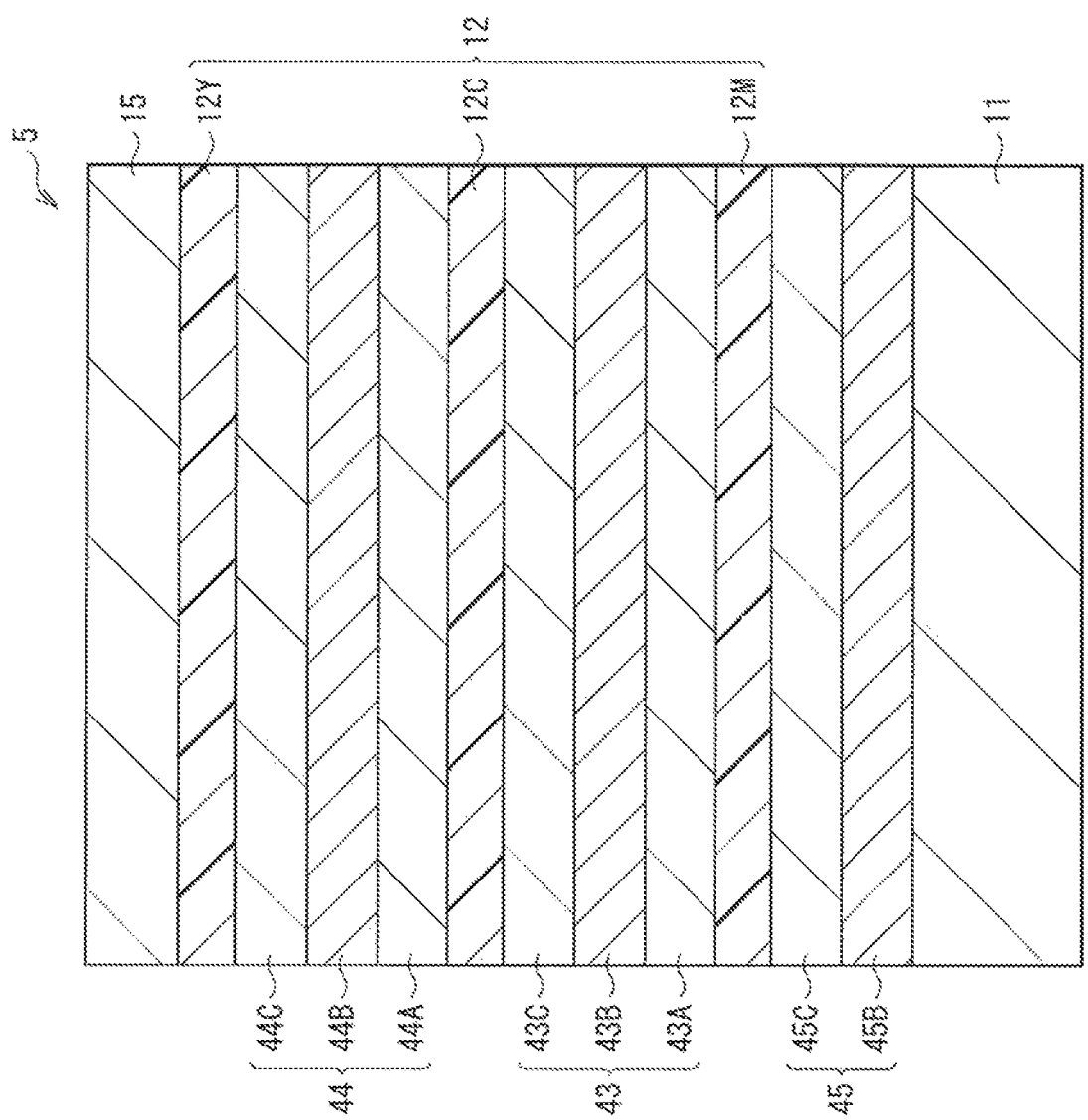

[FIG. 6]
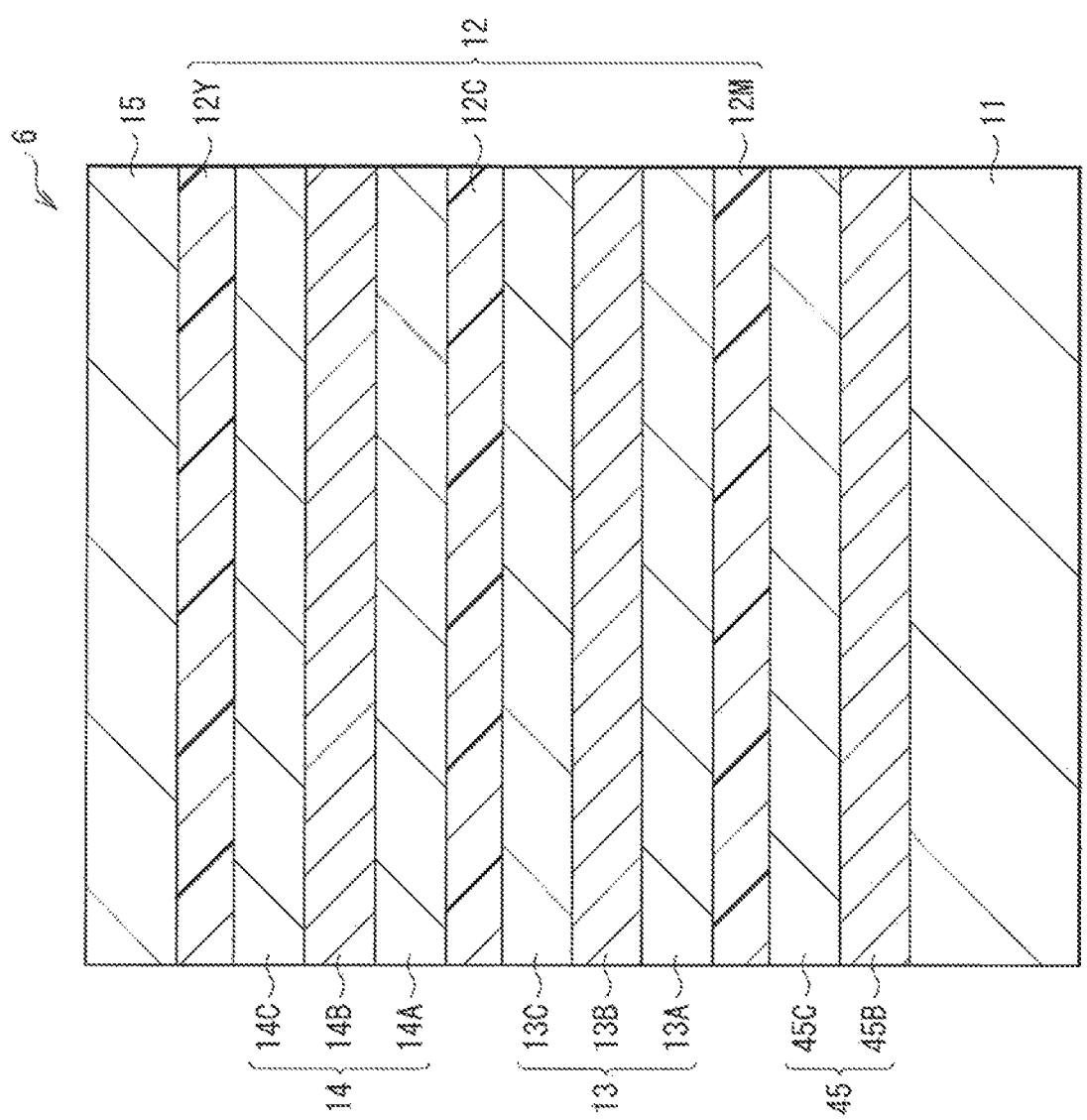

[FIG. 7]
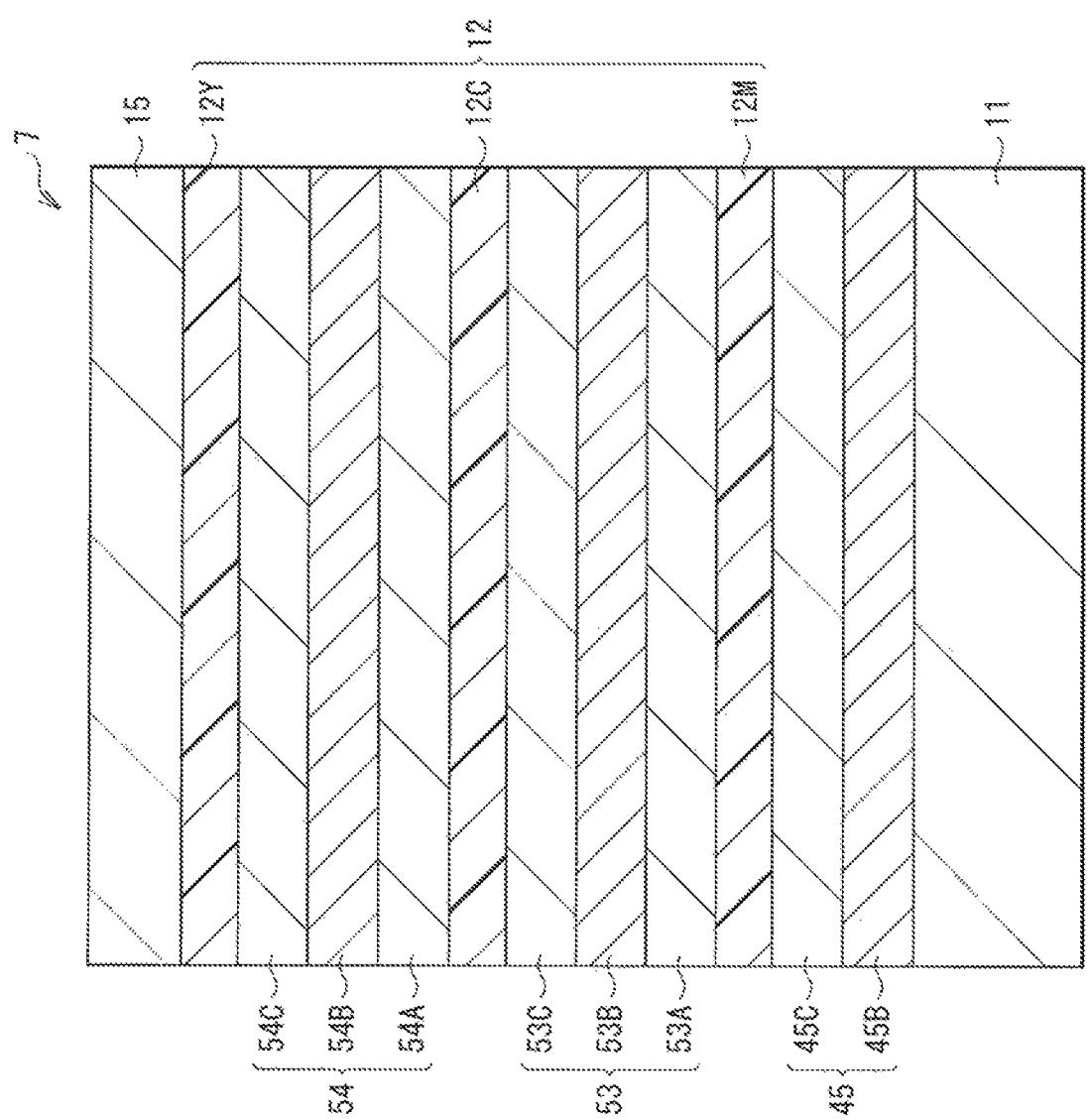

[FIG. 8]
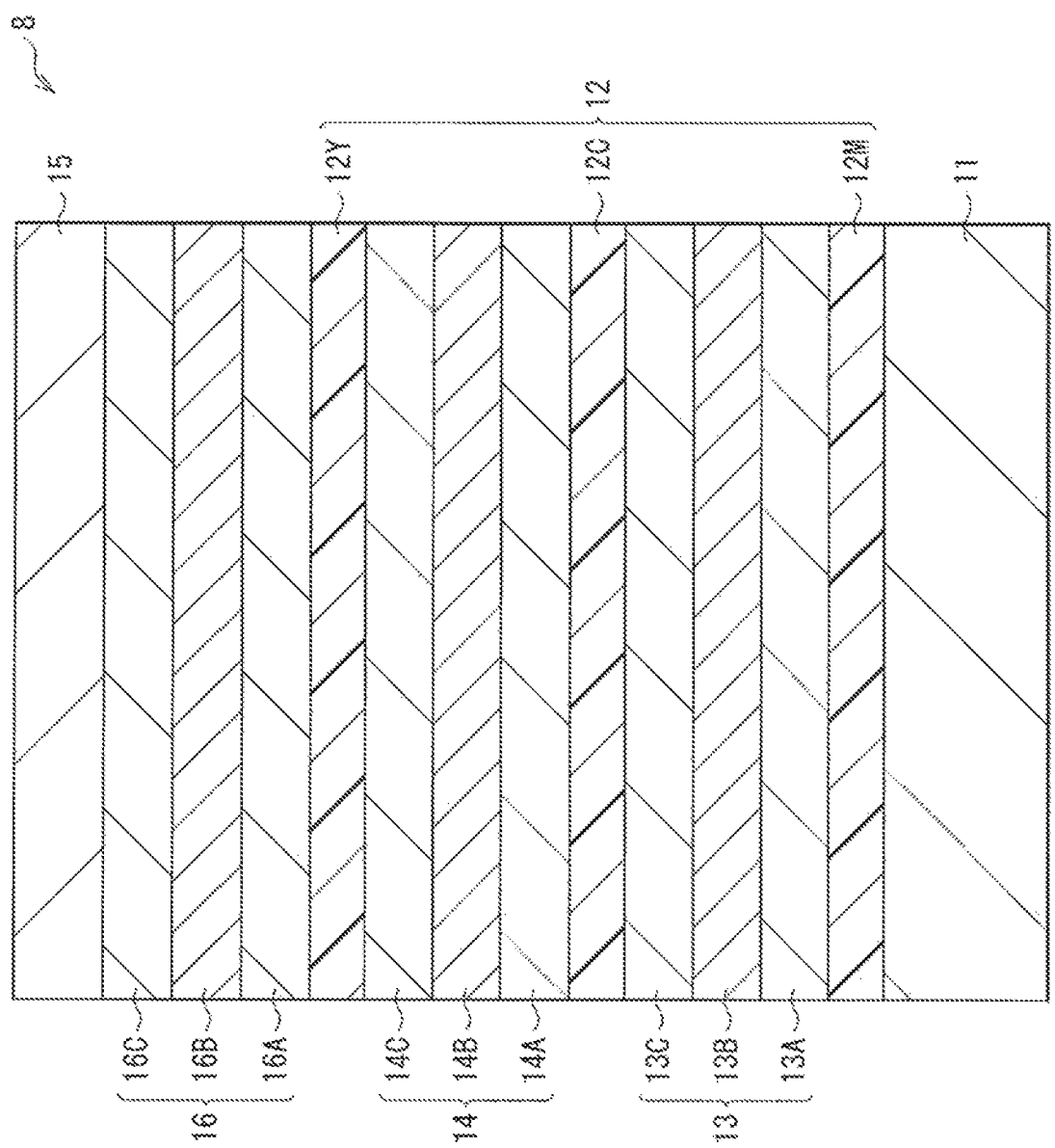

[ FIG. 9 ]
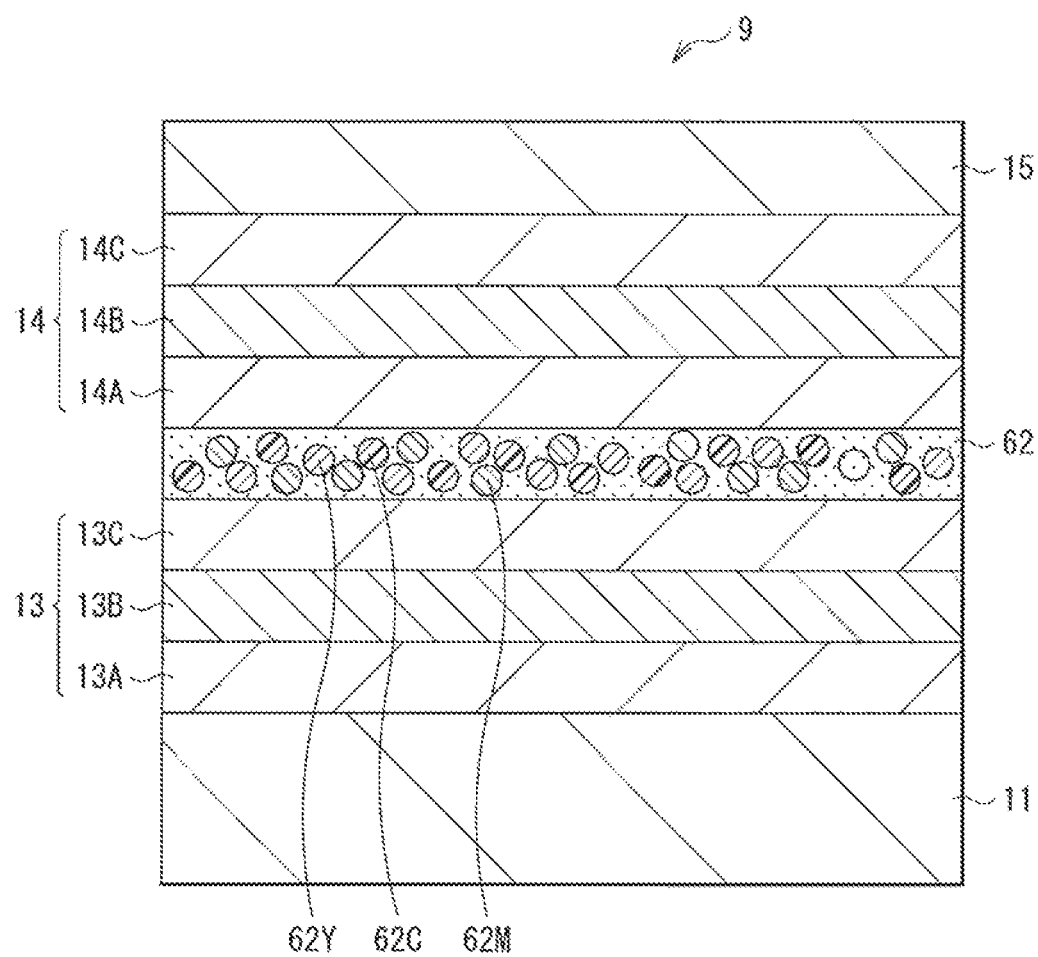

[FIG. 10]
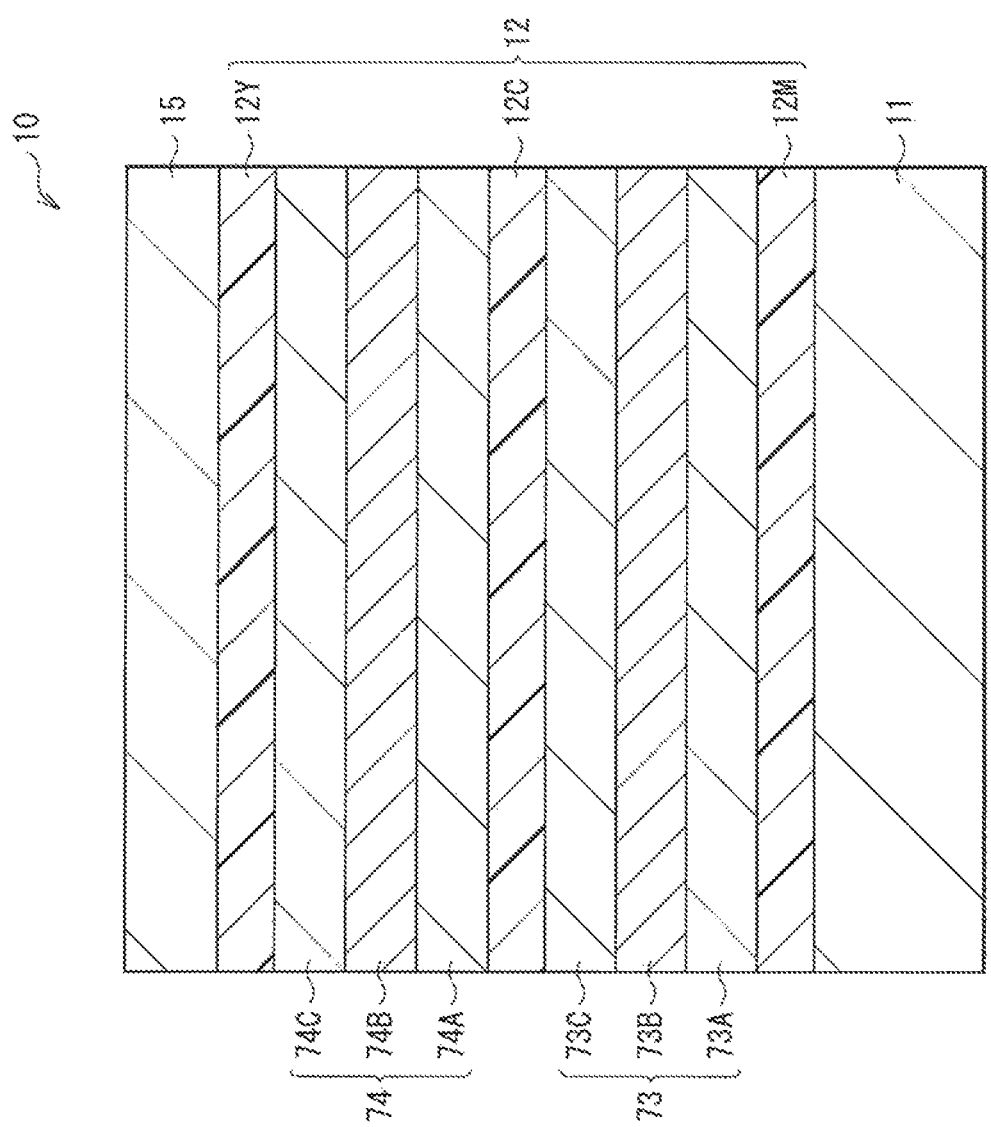

[ FIG. 11A ]
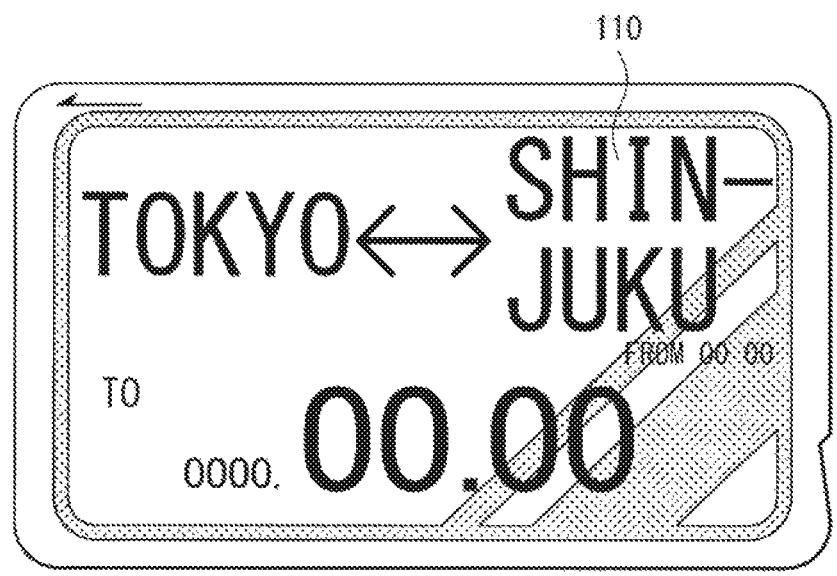
[ FIG. 11B ]
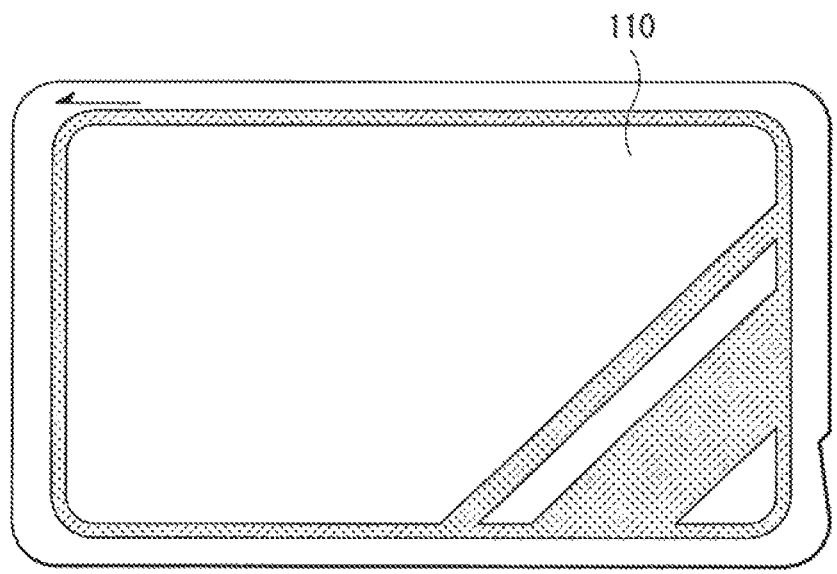

[ FIG. 12A ]
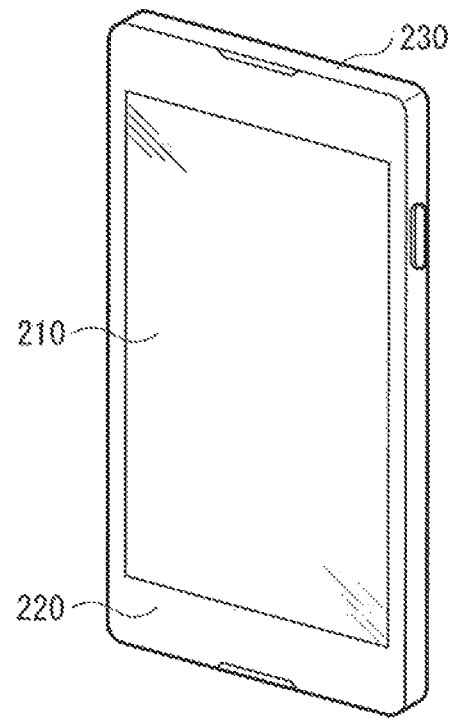
[ FIG. 12B ]
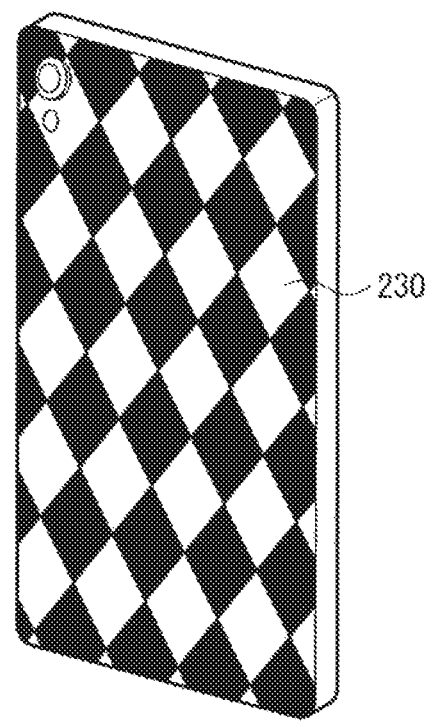

[FIG. 13A]
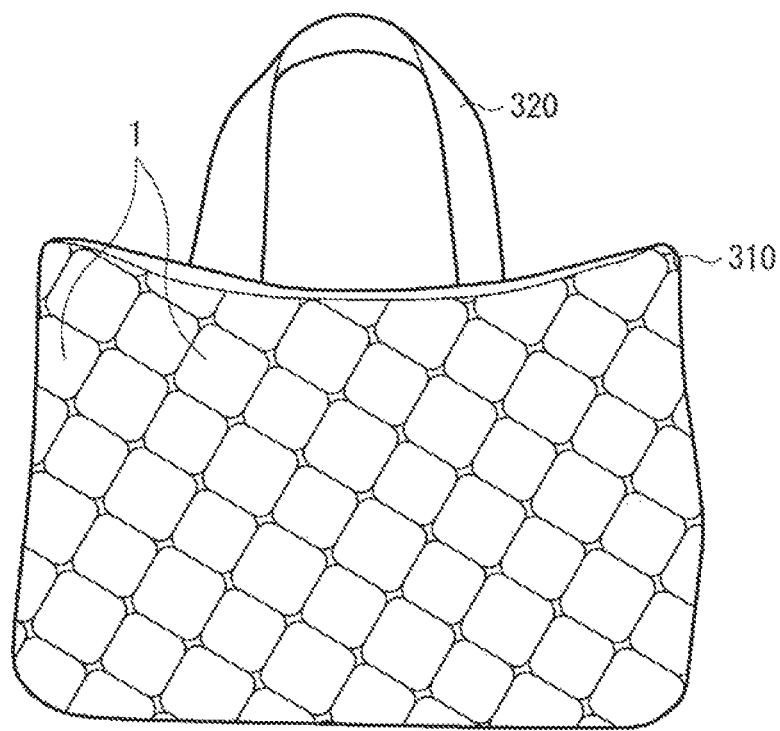
[FIG. 13B]

[FIG. 14]
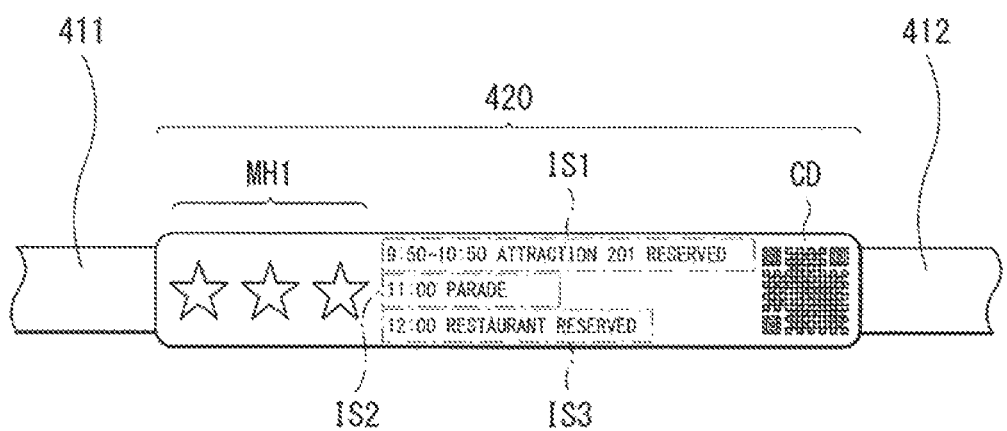

[ FIG. 15A ]
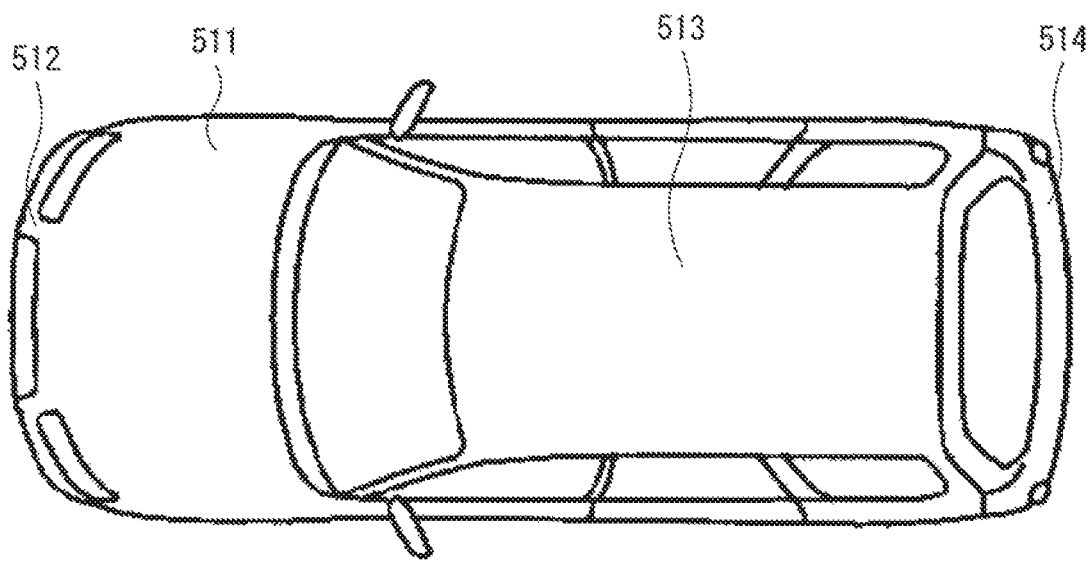
[ FIG. 15B ]
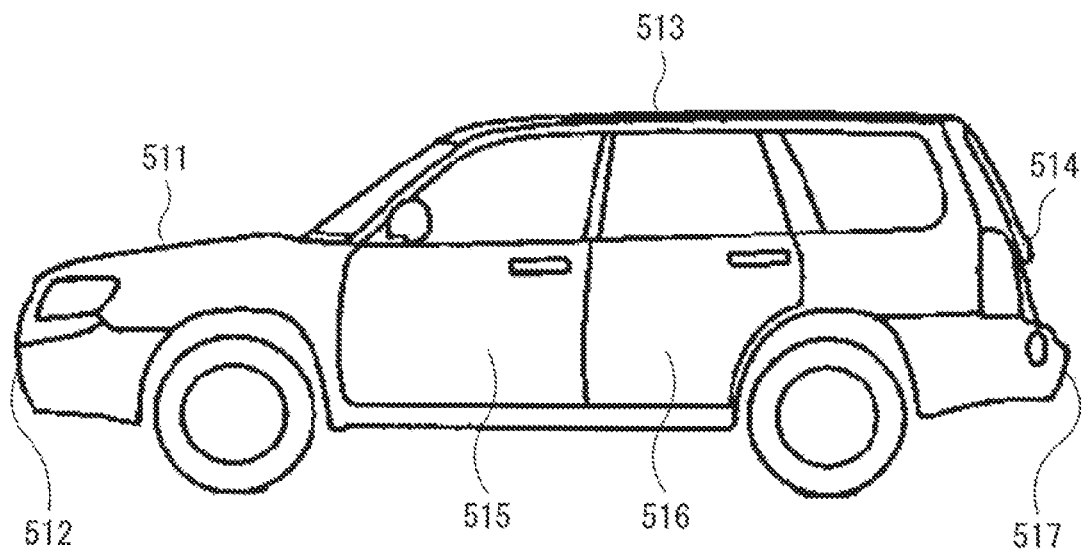

REVERSIBLE RECORDING MEDIUM AND EXTERIOR MEMBER

TECHNICAL FIELD

The present disclosure relates to a reversible recording medium that allows for recording and deletion of, for example, an image, and an exterior member provided therewith.

BACKGROUND ART

Recently, necessity of a rewritable recording technique has been recognized from the viewpoint of global environment. For example, development has been in progress in a recording medium that enables information to be recorded and deleted reversibly by heat, i.e., a so-called reversible recording medium, as an example of a display medium that replaces a printed matter. For example, PTL 1 discloses a reversible multicolor recording medium in which a plurality of recording layers having different developed color tones is stacked with a heat-insulating layer interposed between every two recording layers.

CITATION LIST

Patent Literature

PTL 1: Japanese Unexamined Patent Application Publication No. 2004-155010

SUMMARY OF THE INVENTION

Incidentally, in a rewritable recording medium that enables multicolor display, it is desired to ameliorate deterioration of display quality due to unintended color mixture.

It is desirable to provide a reversible recording medium and an exterior member that make it possible to enhance display quality.

A reversible recording medium according to an embodiment of the present disclosure includes a first recording layer to be colored in a first color, a second recording layer to be colored in a second color, the second color being different from the first color, and a first intermediate layer provided between the first recording layer and the second recording layer, the first intermediate layer including a plurality of layers respectively containing materials different from each other.

An exterior member according to an embodiment of the present disclosure is provided with the above-described reversible recording medium according to an embodiment of the present disclosure over at least one surface of a support substrate.

According to the reversible recording medium of an embodiment of the present disclosure and the exterior member of an embodiment of the present disclosure, the first intermediate layer including a plurality of layers respectively containing materials different from each other is provided between the first recording layer to be colored in the first color and the second recording layer to be colored in a second color different from the first color. This allows reliability of the intermediate layer to be enhanced.

According to the reversible recording medium of an embodiment of the present disclosure and the exterior member of an embodiment of the present disclosure, the first intermediate layer that includes a plurality of layers respectively containing materials different from each other and that is enhanced in reliability is provided between the recording layers (the first recording layer the second first recording layer) to be colored in different colors, thus decreasing occurrence of color mixture during writing. That is, it becomes possible to enhance display quality.

It is to be noted that the effects described here are not necessarily limitative, and may be any of the effects described in the present disclosure.

BRIEF DESCRIPTION OF DRAWINGS

FIG. 1 is a cross-sectional view illustrating an example of a configuration of a reversible recording medium according to an embodiment of the present disclosure.

FIG. 2 is a cross-sectional view illustrating an example of a configuration of a reversible recording medium according to a modification example 1 of the present disclosure.

FIG. 3 is a cross-sectional view illustrating an example of a configuration of a reversible recording medium according to a modification example 2 of the present disclosure.

FIG. 4 is a cross-sectional view illustrating an example of a configuration of a reversible recording medium according to a modification example 3 of the present disclosure.

FIG. 5 is a cross-sectional view illustrating an example of a configuration of a reversible recording medium according to a modification example 4 of the present disclosure.

FIG. 6 is a cross-sectional view illustrating an example of a configuration of a reversible recording medium according to a modification example 5 of the present disclosure.

FIG. 7 is a cross-sectional view illustrating an example of a configuration of a reversible recording medium according to a modification example 6 of the present disclosure.

FIG. 8 is a cross-sectional view illustrating an example of a configuration of a reversible recording medium according to a modification example 7 of the present disclosure.

FIG. 9 is a cross-sectional view illustrating an example of a configuration of a reversible recording medium according to a modification example 8 of the present disclosure.

FIG. 10 is a cross-sectional view illustrating an example of a configuration of a reversible recording medium according to a modification example 9 of the present disclosure.

FIG. 11A is a perspective view illustrating an example of an appearance of an application example 1.

FIG. 11B is a perspective view illustrating another example of the appearance of the application example 1.

FIG. 12A is a perspective view illustrating an example of an appearance (on front side) of an application example 2.

FIG. 12B is a perspective view illustrating an example of an appearance (on rear side) of the application example 2.

FIG. 13A is a perspective view illustrating an example of an appearance of an application example 3.

FIG. 13B is a perspective view illustrating another example of the appearance of the application example 3.

FIG. 14 is an explanatory diagram illustrating a configuration example of an application example 4.

FIG. 15A is a perspective view illustrating an example of an appearance (upper surface) of an application example 5.

FIG. 15B is a perspective view illustrating an example of an appearance (side surface) of the application example 5.

MODES FOR CARRYING OUT THE INVENTION

In the following, some embodiments of the present disclosure are described in detail with reference to the drawings. The following description is directed to specific examples of the present disclosure, and the present disclosure is not limited to the following embodiments. In addition, the present disclosure is not limited to the arrangement, dimensions, dimensional ratios, and the like of the components illustrated in the drawings. It is to be noted that the description is given in the following order.

1. Embodiment (An example of a reversible recording medium provided with an intermediate layer having a multilayer structure between recording layers)
   1-1. Configuration of Reversible Recording Medium
   1-2. Manufacturing Method of Reversible Recording Medium
   1-3. Recording and Deletion Methods of Reversible Recording Medium
   1-4. Workings and Effects
2. Modification Examples
   2-1. Modification Example 1 (An example in which a layer having a high barrier performance is provided as a second layer of an intermediate layer)
   2-2. Modification Example 2 (An example in which a porous layer is provided as the second layer of the intermediate layer)
   2-3. Modification Example 3 (An example in which a layer having a heat radiation property is provided as the second layer of the intermediate layer)
   2-4. Modification Example 4 (An example in which a layer having a heat radiation property is added over a support base)
   2-5. Modification Example 5 (An example in which a layer having a low Young's modulus is provided as the second layer of the intermediate layer and a layer having a heat radiation property is provided over the support base)
   2-6. Modification Example 6 (An example in which a layer having a low Young's modulus and a layer having a high barrier performance are provided for the intermediate layer)
   2-7. Modification Example 7 (An example in which the intermediate layer is provided between a recording layer 12Y and a protective layer)
   2-8. Modification Example 8 (An example in which a plurality of types of coloring compounds is included in a recording layer)
   2-9. Modification Example 9 (An example in which a layer having a low shrinkage rate is provided as the second layer of the intermediate layer)
3. Application Examples 1. Embodiment FIG. 1 illustrates a cross-sectional configuration of a reversible recording medium (a reversible recording medium 1) according to an embodiment of the present disclosure. The reversible recording medium 1 includes, for example, a recording layer 12 that is disposed over a support base 11 and allows for reversible change between a recorded state and a deleted state. The recording layer 12 has, for example, a configuration in which three layers (a recording layer 12M, a recording layer 12C, and a recording layer 12Y) are stacked in this order. In the present embodiment, intermediate layers 13 and 14 each including a plurality of layers (three layers in this case) are respectively provided between the recording layers 12M and 12C and between the recording layers 12C and 12Y. It is to be noted that FIG. 1 schematically illustrates the cross-sectional configuration of the reversible recording medium 1 and that the size and shape thereof may be different from the actual size and shape thereof in some cases.

[1-1. Configuration of Reversible Recording Medium]

The reversible recording medium 1 according to the present embodiment is formed by stacking a plurality of recording layers 12 to be colored in different colors, the intermediate layers 13 and 14 each provided between the recording layers 12, and a protective layer 15 over the recording layer 12Y. Specifically, the recording layer 12M includes the recording layer 12M to be colored in a magenta color (M), the recording layer 12C to be colored in a cyan color (C), and the recording layer 12Y to be colored in a yellow color (Y). This allows the reversible recording medium 1 to color multicolor display. The intermediate layers 13 and 14 has a three-layer structure as described above, and the first layer(s) 13A (and 14A), the second layer(s) 13B (and 14B), and the third layer(s) 13C (and 14C) are stacked in this order from side of the support base 11, and the first layer 14A, the second layer 14B, and the third layer 14C are stacked in this order from side of the support base 11. In the present embodiment, the layers (the second layers 13B and 14B) sandwiched between other layers (the first layers 13A and 14A and the third layers 13C and 14C) are each formed using a material having a lower Young's modulus than the other layers.

The support base 11 serves to support the recording layer 12. The support base 11 is configured by a material having superior heat resistance as well as superior size stability in a planar direction. The support base 11 may have a property of either light-transmissivity or non-light transmissivity. For example, the support base 11 either may be a substrate having rigidity, such as a wafer, or may be configured by flexible thin layer glass, film, paper, or the like. The use of a flexible substrate as the support base 11 allows for achievement of a flexible (foldable) reversible recording medium.

Examples of a constituent material of the support base 11 include an inorganic material, a metal material, and a macromolecular material such as plastic. Specific examples of the inorganic material include silicon (Si), silicon oxide (SiOx), silicon nitride (SiNx), aluminum oxide (AlOx), and magnesium oxide (MgOx). Examples of silicon oxide include glass and spin-on-glass (SOG). Examples of the metal material include metal element such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum (Ta), titanium (Ti), bismuth (Bi), antimony (Sb), or lead (Pb), or an alloy containing two or more of those. Specific examples of the alloy include stainless steel (SUS), an aluminum alloy, a magnesium alloy, a titanium alloy, and the like. Examples of the macromolecular material include a phenol resin, an epoxy resin, a melamine resin, an unsaturated polyester resin, a urethane resin, polyimide, polyethylene, high-density polyethylene, medium-density polyethylene, low-density polyethylene, polypropylene, polyvinyl chloride, polyvinylidene chloride, polystyrene, polyvinyl acetate, polyurethane, an acrylonitrile butadiene styrene resin (ABS), an acrylic resin (PMMA), polyamide, nylon, polyacetal, polycarbonate (PC), denatured polyphenylene ether, polyethylene terephthalate (PET), polybutylene terephthalate, cyclic polyolefin, polyphenylene sulfide, polytetrafluoroethylene (PTFE), polysulfone, polyethersulfone, non-crystalline polyarylate, liquid crystal polymer, polyether ether ketone (PEEK), polyamide imide, polyethylene naphthalate (PEN), and triacetyl cellulose, cellulose, or a copolymer thereof, glass-fiber reinforced plastic, carbon-fiber reinforced plastic (CFRP), and the like. It is to be noted that an upper surface or a lower surface of the support base 11 may be provided with a reflective layer. The provision of the reflective layer allows for more vivid color display.

The recording layer 12 (12M, 12C, and 12Y) enables information to be recorded and deleted reversibly by heat, and is configured by a material that allows for stable repeated recording and allows for control of a decolored state and a color-developed state. Specifically, the recording layers 12M, 12C, and 12Y respectively formed by, for example, macromolecular materials that respectively include coloring compounds to be colored in different colors, color developing/quenching agents corresponding to the respective coloring compounds, and photothermal conversion materials that absorb light rays of different wavelength regions to generate heat. A film thickness (hereinafter, simply referred to as thickness) in a stacking direction of each of the recording layers 12M, 12C, and 12Y is more than or equal to 1 μm and less than or equal to 10 μm, for example.

Specifically, the recording layer 12M includes, for example, a coloring compound to be colored in a magenta color, a color developing/quenching agent corresponding to the coloring compound, and a photothermal conversion material that absorbs an infrared ray of a wavelength $\lambda_1$, for example, to generate heat. The recording layer 12C includes, for example, a coloring compound that develops a cyan color, a color developing/quenching agent corresponding to the coloring compound, and a photothermal conversion material that absorbs an infrared ray of a wavelength $\lambda_2$, for example, to be colored. The recording layer 12Y includes, for example, a coloring compound to be colored in a yellow color, a color developing/quenching agent corresponding to the coloring compound, and a photothermal conversion material that absorbs an infrared ray of a wavelength $\lambda 3$, for example, to generate heat. The wavelengths $\lambda_1$, $\lambda_2$, and $\lambda_3$ differs from each other.

It is to be noted that the recording layers 12M, 12C, and 12Y become transparent in a decolored state. This enables the reversible recording medium 1 to perform recording in a wide color gamut. The film thickness (hereinafter, simply referred to as thickness) of each of the recording layers 12M, 12C, and 12Y in the stacking direction is more than or equal to 1 μm and less than or equal to 10 μm, for example.

Examples of the coloring compound include a leuco pigment. Examples of the leuco pigment include existing pigment for heat-sensitive paper. A specific example thereof includes a compound that contains, in a molecule, a group having an electron-donating property and is represented by the following formula (1).

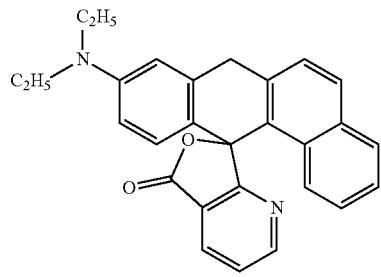

(1)

The coloring compounds used for the recording layers 12M, 12C, and 12Y are not particularly limited, and it is possible to be appropriately selected according to the purposes. Specific examples of the coloring compound include, in addition to the compound shown in the above formula (1), a fluoran-based compound, a triphenylmethane phthalide-based compound, an azaphthalide-based compound, a phenothiazine-based compound, a leuco auramine-based compound, an indolinophthalide-based compound, and the like. Other examples include 2-anilino-3-methyl-6-diethylaminofluoran, 2-anilino-3-methyl-6-di(n-butylamino)fluoran, 2-anilino-3-methyl-6-(N-n-propyl-N-methylamino)fluoran, 2-anilino-3-methyl-6-(N-isopropyl-N-methylamino)fluoran, 2-anilino-3-methyl-6-(N-isobutyl-N-methylamino)fluoran, 2-anilino-3-methyl-6-(N-n-amyl-N-methylamino)fluoran, 2-anilino-3-methyl-6-(N-sec-butyl-N-methylamino)fluoran, 2-anilino-3-methyl-6-(N-n-amyl-N-ethylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-cyclohexyl-N-methylamino)fluoran, 2-anilino-3-methyl-6-(N-ethyl-p-toluidino)fluoran, 2-anilino-3-methyl-6-(N-methyl-p-toluidino)fluoran, 2-(m-trichloromethylanilino)-3-methyl-6-diethylaminofluoran, 2-(m-trifluoromethylanilino)-3-methyl-6-diethylaminofluoran, 2-(m-trichloromethylanilino)-3-methyl-6-(N-cyclohexyl-N-methylamino)fluoran, 2-(2,4-dimethylanilino)-3-methyl-6-diethylaminofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-anilino-6-(N-n-hexyl-N-ethylamino)fluoran, 2-(o-chloroanilino)-6-diethylaminofluoran, 2-(o-chloroanilino)-6-dibutylaminofluoran, 2-(m-trifluoromethylanilino)-6-diethylaminofluoran, 2,3-dimethyl-6-dimethylaminofluoran, 3-methyl-6-(N-ethyl-p-toluidino)fluoran, 2-chloro-6-diethylaminofluoran, 2-bromo-6-diethylaminofluoran, 2-chloro-6-dipropylaminofluoran, 3-chloro-6-cyclohexylaminofluoran, 3-bromo-6-cyclohexylaminofluoran, 2-chloro-6-(N-ethyl-N-isoamylamino)fluoran, 2-chloro-3-methyl-6-diethylaminofluoran, 2-anilino-3-chloro-6-diethylaminofluoran, 2-(o-chloroanilino)-3-chloro-6-cyclohexylaminofluoran, 2-(m-trifluoromethylanilino)-3-chloro-6-diethylaminofluoran, 2-(2,3-dichloroanilino)-3-chloro-6-diethylaminofluoran, 1,2-benzo-6-diethylaminofluoran, 3-diethylamino-6-(m-trifluoromethylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-octyl-2-methylindole-3-yl)-3-(2-ethoxy-4-diethylaminophenyl)-4-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3,3-bis(2-ethoxy-4-diethylaminophenyl)-4-azaphthalide, 3,3-bis(2-ethoxy-4-diethylaminophenyl)-7-azaphthalide, 2-(p-acetylanilino)-6-(N-n-amyl-N-n-butylamino)fluoran, 2-benzylamino-6-(N-ethyl-p-toluidino)fluoran, 2-benzylamino-6-(N-methyl-2,4-dimethylanilino)fluoran, 2-benzylamino-6-(N-ethyl-2,4-dimethylanilino)fluoran, 2-benzylamino-6-(N-methyl-p-toluidino)fluoran, 2-benzylamino-6-(N-ethyl-p-toluidino)fluoran, 2-(di-p-methylbenzylamino)-6-(N-ethyl-p-toluidino)fluoran, 2-(α-phenylethylamino)-6-(N-ethyl-p-toluidino)fluoran, 2-methylamino-6-(N-methylamino)fluoran, 2-methylamino-6-(N-ethylanilino)fluoran, 2-methylamino-6-(N-propylanilino)fluoran, 2-ethylamino-6-(N-methyl-p-toluidino)fluoran, 2-methylamino-6-(N- methyl-2,4-dim ethylanilino)fluoran, 2-ethylamino-6-(N-ethyl-2,4-dim ethylanilino)fluoran, 2-dimethylamino-6-(N-methylanilino)fluoran, 2-dimethylamino-6-(N-ethylanilino)fluoran, 2-diethylamino-6-(N-methyl-p-toluidino)fluoran, 2-diethylamino-6-(N-ethyl-p-toluidino)fluoran, 2-dipropylamino-6-(N-methylanilino)fluoran, 2-dipropylamino-6-(N-ethylanilino)fluoran, 2-amino-6-(N-methylanilino)fluoran, 2-amino-6-(N-ethylanilino)fluoran, 2-amino-6-(N-propylanilino)fluoran, 2-amino-6-(N-methyl-p-toluidino)fluoran, 2-amino-6-(N-ethyl-p-toluidino)fluoran, 2-amino-6-(N-propyl-p-toluidino)fluoran, 2-amino-6-(N-methyl-p-ethylanilino)fluoran, 2-amino-6-(N-ethyl-p-ethylanilino)fluoran, 2-amino-6-(N-propyl-p-ethylanilino)fluoran, 2-amino-6-(N-methyl-2,4-dimethylanilino)fluoran, 2-amino-6-(N-ethyl-2,4-dimethylanilino)fluoran, 2-amino-6-(N-propyl-2,4-dimethylanilino)fluoran, 2-amino-6-(N-methyl-p-chloroanilino)fluoran, 2-amino-6-(N-ethyl-p-chloroanilino)fluoran, 2-amino-6-(N-propyl-p-chloroanilino)fluoran, 1,2-benzo-6-(N-ethyl-N-isoamylamino)fluoran, 1,2-benzo-6-dibutylaminofluoran, 1,2-benzo-6-(N-methyl-N-cyclohexylamino)fluoran, 1,2-benzo-6-(N-methyl-N-toluidino)fluoran, and the like. For the recording layers 12M, 12C, and 12Y, one kind of the above coloring compounds may be used alone, or two or more kinds may be used in combination.

The color developing/quenching agent serves, for example, to develop a color of a colorless coloring compound or to decolor a coloring compound colored in a predetermined color. Examples of the color developing/quenching agent include a phenol derivative, a salicylic acid derivative, and a urea derivative. Specific examples thereof include a compound having a salicylic acid skeleton represented by the following general formula (2) and containing, in a molecule, a group having an electron-accepting property.

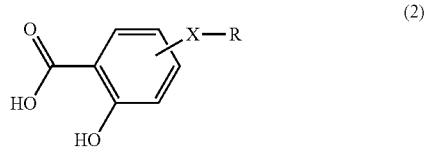

(2)

(X is one of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R is a linear hydrocarbon group having 25 to 34 carbon atoms.)

Other examples of the color developing/quenching agent include 4,4'-isopropylidenebisphenol, 4,4'-isopropylidenebis(o-methylphenol), 4,4'-secondary butylidenebisphenol, 4,4'-isopropylidenebis(2-tertiary butylphenol), zinc p-nitrobenzoate, 1,3,5-tris(4-tertiary butyl-3-hydroxy-2,6-dimethylbenzyl)isocyanuric acid, 2,2-(3,4'-dihydroxydiphenyl)propane, bis(4-hydroxy-3-methylphenyl)sulfide, 4-{β-(p-methoxyphenoxy)ethoxy}salicylic acid, 1,7-bis(4-hydroxyphenylthio)-3,5-dioxaheptane, 1,5-bis(4-hydroxyphenylthio)-5-oxapentane, phthalic acid monobenzyl ester monocalcium salt, 4,4'-cyclohexylidenediphenol, 4,4'-isopropylidenebis(2-chlorophenol), 2,2'-methylenebis(4-methyl-6-tertiary-butylphenol), 4,4'-butylidenebis(6-tertiary-butyl-2-methyl)phenol, 1,1,3-tris(2-methyl-4-hydroxy-5-tertiary-butylphenyl)butane, 1,1,3-tris(2-methyl-4-hydroxy-5-cyclohexylphenyl)butane, 4,4'-thiobis(6-tertiary-butyl-2-methyl)phenol, 4,4'-diphenolsulfone, 4-isopropoxy-4'-hydroxydiphenylsulfone (4-hydroxy-4'-isopropoxydiphenyl sulfone), 4-benzyloxy-4'-hydroxydiphenyl sulfone, 4,4'-diphenolsulfoxide, isopropyl p-hydroxybenzoate, benzyl p-hydroxybenzoate, benzyl protocatechuate, stearyl gallate, lauryl gallate, octyl gallate, 1,3-bis(4-hydroxyphenylthio)-propane, N,N'-diphenylthiourea, N,N'-di(m-chlorophenyl)thiourea, salicylanilide, bis(4-hydroxyphenyl)methyl acetate, bis(4-hydroxyphenyl)benzyl acetate, 1,3-bis(4-hydroxycumyl)benzene, 1,4-bis(4-hydroxycumyl)benzene, 2,4'-diphenol sulfone, 2,2'-diallyl-4,4'-diphenol sulfone, 3,4-dihydroxyphenyl-4'-methyldiphenyl sulfone, zinc 1-acetyloxy-2-naphthoate, zinc 2-acetyloxy-1-naphthoate, zinc 2-acetyloxy-3-naphthoate, α,α-bis(4-hydroxyphenyl)-α-methyltoluene, an antipyrine complex of zinc thiocyanate, tetrabromobisphenol A, tetrabromobisphenol S, 4,4'-thiobis(2-methylphenol), 4,4'-thiobis(2-chlorophenol), dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, α-hydroxydodecylphosphonic acid, α-hydroxytetradecylphosphonic acid, α-hydroxyhexadecylphosphonic acid, α-hydroxyoctadecylphosphonic acid, α-hydroxyeicosylphosphonic acid, α-hydroxydocosylphosphonic acid, α-hydroxytetracosylphosphonic acid, dihexadecyl phosphate, dioctadecyl phosphate, dieicosyl phosphate, didocosyl phosphate, monohexadecyl phosphate, monooctadecyl phosphate, monoeicosyl phosphate, monodocosyl phosphate, methylhexadecyl phosphate, methyloctadecyl phosphate, methyleicosyl phosphate, methyldocosyl phosphate, amylhexadecyl phosphate, octylhexadecyl phosphate, laurylhexadecyl phosphate, and the like. For the recording layers 12M, 12C, and 12Y, one kind of the above color developing/quenching agents may be used alone, or two or more kinds may be used in combination.

The photothermal conversion material serves, for example, to absorb light in a wavelength region of a property of a near infrared region (e.g., a wavelength of more than or equal to 700 nm and less than or equal to 2500 nm) to generate heat. In the present embodiment, it is preferable to select, for the photothermal conversion materials to be used for the recording layers 12M, 12C, and 12Y, a combination of materials having narrow photoabsorption bands that do not overlap one another. This makes it possible to selectively color or decolor a desired layer of the recording layers 12M, 12C, and 12Y. Example of the photothermal conversion agent included in the recording layer 12M includes a photothermal conversion agent that has an absorption peak in a wavelength of 915 nm. Example of the photothermal conversion agent included in the recording layer 12C includes a photothermal conversion agent that has an absorption peak in a wavelength of 860 nm. Example of the photothermal conversion agent included in the recording layer 12Y includes a photothermal conversion agent that has an absorption peak in a wavelength of 760 nm. It is to be noted that the above absorption peaks are examples, and are not limited thereto.

Examples of the photothermal conversion material include a compound having a phthalocyanine skeleton (a phthalocyanine-based pigment), a compound having a naphthalocyanine skeleton (a naphthalocyanine-based pigment), a compound having a squarylium skeleton (a squarylium-based pigment), an organic compound such as a diimonium salt, or an aminium salt, a metal complex such as a dithio complex, an inorganic compound such as cobalt tetraoxide, iron oxide, chromium oxide, copper oxide, titanium black, ITO, niobium nitride, and an organometallic compound such as tantalum carbide.

Aside from those described above, a compound having a cyanine skeleton (a cyanine-based pigment) with superior light resistance and superior heat resistance may be used. As used herein, the superior light resistance refers to not being decomposedpolyvinyl butyral during laser irradiation. The superior heat resistance means that a change more than or equal to 20% does not occur to a maximum absorption peak value of an absorption spectrum when being formed as a film together with a macromolecular material, for example, and being stored at 150° C. for 30 minutes, for example. Examples of such a compound having a cyanine skeleton include a compound containing, in a molecule, one or both of a counter ion of one of $SbF_6$, $PF_6$, $BF_4$, $ClO_4$, $CF_3SO_3$ and $(CF_3SO_3)_2N$ and a methine chain containing a five-membered ring or a six-membered ring.

It is to be noted that, although the cyanine-based pigment is preferably provided with both of one of the above-mentioned counter ions and the ring structure such as a five-membered ring and a six-membered ring in a methine chain, the provision of at least one of those allows sufficient light resistance and heat resistance to be secured. A material with superior light resistance and superior heat resistance does not decompose during laser irradiation, as described above. Examples of a way to confirm the superior light resistance include a method of measuring a peak change in an absorption spectrum at the time of a xenon lamp irradiation test. When a change rate is 20% or less at the time of irradiation for 30 minutes, it is possible to judge that light resistance is favorable. Examples of a way to confirm the superior heat resistance include a method of measuring a peak change in an absorption spectrum at the time of storing at 150° C. When a change rate is 20% or less after the 30-minute test, it is possible to judge that heat resistance is favorable.

As the macromolecular material, it is preferable to adopt a material in which the coloring compound, the color developing/quenching agent, and the photothermal conversion material are easily dispersed evenly. As the macromolecular material, for example, a matrix resin is preferably used; examples thereof include a thermosetting resin and a thermoplastic resin. Specific examples thereof include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide. The above macromolecular materials may be crosslinked and used.

The recording layers 12M, 12C, and 12Y each include at least one of the coloring compounds, at least one of the color developing/quenching agents, and at least one of the photothermal conversion materials. The recording layers 12M, 12C, and 12Y may each include, in addition to the above-mentioned materials, various additives such as a sensitizer and an ultraviolet absorbing agent, for example.

The intermediate layers 13 and 14 serve to suppress diffusion of contained molecules and occurrence of heat transfer at the time of drawing, between the recording layer 12M and the recording layer 12C and between the recording layer 12C and the recording layer 12Y. The intermediate layer 13 has a configuration in which, as described above, a first layer 13A, a second layer 13B, and a third layer 13C are stacked in this order, and the intermediate layer 14 similarly has a configuration in which a first layer 14A, a second layer 14B, and a third layer 14C are stacked in this order. Each of the layers 13A, 13B, and 13C(, 14A, 14B, and 14C) is formed using a typical macromolecular material having translucency, and in particular, it is preferable that the middle layers (the second layers 13B and 14B) in the above-mentioned multilayer structure be each formed using a material having a lower Young's modulus than the other layers (the first layers 13A and 14A and the third layers 13C and 14C).

The first layers 13A and 14A and the third layers 13C and 14C are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Examples of the material of the second layers 13B and 14B include a silicone-based elastomer, an acrylic elastomer, a urethane-based elastomer, a styrene-based elastomer, a polyester-based elastomer, an olefin-based elastomer, a polyvinyl chloride-based elastomer, a natural rubber, a styrene-butadiene rubber, an isoprene rubber, a butadiene rubber, a chloroprene rubber, an acrylonitrile-butadiene rubber, a butyl rubber, an ethylene-propylene rubber, an ethylene-propylene-diene rubber, a urethane rubber, a silicone rubber, a fluorine rubber, chlorosulfonated polyethylene, chlorinated polyethylene, an acrylic rubber, a polysulfide rubber, an epichlorohydrin rubber, polydimethylsiloxane (PDMS), polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Combinations of materials included in the layers 13A, 13B, and 13C(, 14A, 14B, and 14C) are not limited as long as the materials of the second layers 13B and 14B each have a lower Young's modulus than the materials of the first layers 13A and 14A and the third layers 13C and 14C. Further, for the intermediate layers 13 and 14, the above macromolecular materials may be crosslinked and used. In addition, the intermediate layers 13 and 24 may include various additive such as an ultraviolet absorbing agent, for example.

A thickness of each of the intermediate layers 13 and 14 is preferably more than or equal to 1 μm and less than or equal to 100 for example, and more preferably more than or equal to 5 μm and less than or equal to 20 for example. Among those, a thickness of each of the first layers 13A and 14A is preferably more than or equal to 0.1 μm and less than or equal to 10 μm or less, for example, and a thickness of each of the second layers 13B and 14B is preferably more than or equal to 0.01 μm and less than or equal to 10 for example. A thickness of each of the third layers 13C and 14C is preferably more than or equal to 0.1 μm and less than or equal to 10 for example.

The protective layer 15 serves to protect a surface of the recording layer 12 (here, the recording layer 12Y), and is formed using an ultraviolet curable resin or a thermosetting resin, for example. The protective layer 15 has a thickness of more than or equal to 0.1 μm and less than or equal to 100 for example.

[1-2. Manufacturing Method of Reversible Recording Medium]

The reversible recording medium 1 according to the present embodiment may be manufactured using an application method, for example. It is to be noted that the manufacturing method described below is an example of a method of directly forming each layer included in the reversible recording medium 1 over the support base 11.

A white polyethylene terephthalate substrate having a thickness of 0.188 mm is first provided as the support base 11. Next, 0.23 g of the leuco pigment (magenta color) represented by the above formula (1), 0.4 g of the color developing/quenching agent (alkyl salicylate) represented by the above formula (2), 0.01 g of a phthalocyanine-based photothermal conversion material A (absorption wavelength: 915 nm), and 0.8 g of a macromolecular material (poly(vinyl chloride-co-vinyl acetate (9:1))) are added to 8.8 g of a solvent (methyl ethyl ketone (MEK)), and the resultant is dispersed for 2 hours using a rocking mill to prepare a homogeneous dispersion liquid (coating A). The coating A is applied onto the support base 11 using a wire bar, and is then subjected to heating and drying treatments at 70° C. for 5 minutes to form the recording layer 12M having a thickness of 3 μm to be colored in the magenta color.

Subsequently, a polyester aqueous solution is applied onto the recording layer M, and thereafter, the resultant is dried to form the first layer 13A having a thickness of 3 μm. Next, a polyester aqueous solution having a low Young's modulus is applied onto the first layer 13A, and thereafter, the resultant is dried to form the second layer 13B having a thickness of 6 μm. Subsequently, a polyester aqueous solution is applied onto the second layer 13B, and thereafter, the resultant is dried to form the third layer 13C having a thickness of 3 μm.

Next, 0.2 g of a leuco pigment (cyan color) represented by the following formula (3), 0.4 g of the color developing/quenching agent (alkyl salicylate) represented by the above formula (2), 0.01 g of a phthalocyanine-based photothermal conversion material B (absorption wavelength: 860 nm), and 0.8 g of a macromolecular material (poly(vinyl chloride-co-vinyl acetate(9:1))) are added to 8.8 g of a solvent (methyl ethyl ketone (MEK)), and the resultant is dispersed for 2 hours using a rocking mill to prepare a homogeneous dispersion liquid (coating B). The coating B is applied onto an intermediate layer, and is subjected to heating and drying treatments at 70° C. for 5 minutes to form the recording layer 12C having a thickness of 3 μm to be colored in the cyan color.

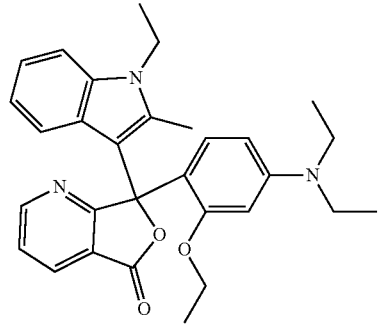

(3)

Subsequently, a polyester aqueous solution is applied onto the recording layer C, and thereafter, the resultant is dried to form the first layer 14A having a thickness of 3 Next, a polyester aqueous solution having a low Young's modulus is applied onto the first layer 14A, and thereafter, the resultant is dried to form the second layer 14B having a thickness of 6 Subsequently, a polyester aqueous solution is applied onto the second layer 14B, and thereafter, the resultant is dried to form the third layer 14C having a thickness of 3 μm.

Next, 0.15 g of a leuco pigment (yellow color) represented by the following formula (4), 0.4 g of the color developing/quenching agent (alkyl salicylate) represented by the above formula (2), 0.01 g of a phthalocyanine-based photothermal conversion material C (absorption wavelength: 760 nm), and 0.8 g of a polymer (poly(vinyl chloride-co-vinyl acetate(9:1))) are added to 8.8 g of a solvent (methyl ethyl ketone (MEK)), and the resultant is dispersed for 2 hours using a rocking mill to prepare a homogeneous dispersion liquid dispersion liquid (coating C), is applied onto an intermediate layer, and is subjected to heating and drying treatments at 70° C. for 5 minutes to form the recording layer 12Y having a thickness of 3 μm to be colored in the yellow color.

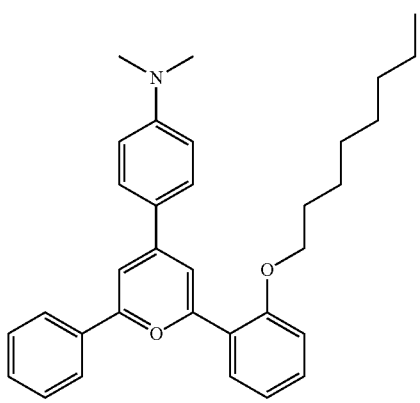

(4)

Lastly, an ultraviolet curable resin is used on the recording layer 12Y to form the protective layer 15 having a thickness of about 2 μm. The above allows for completion of the reversible recording medium 1 illustrated in FIG. 1.

Further, it is also possible to manufacture the reversible recording medium 1 using the following method. The manufacturing method of the reversible recording medium 1 described below is an example of a manufacturing method using A release/transfer polyethylene terephthalate substrate having a thickness of 50 μm is first provided as a temporary base for transfer. Subsequently, an ultraviolet curable resin is used on one surface (release coat surface) of the release/transfer polyethylene terephthalate substrate to form a protective layer having a thickness of about 2 μm Subsequently, 0.15 g of the leuco pigment (yellow color) represented by the above formula (4), 0.4 g of the color developing/quenching agent (alkyl salicylate) represented by the above formula (2), 0.01 g of a phthalocyanine-based photothermal conversion material C (absorption wavelength: 760 nm), and 0.8 g of a polymer (poly(vinyl chloride-co-vinyl acetate(9:1))) are added to 8.8 g of a solvent (methyl ethyl ketone (MEK)), and the resultant is dispersed for 2 hours using a rocking mill to prepare a homogeneous dispersion liquid dispersion liquid (coating C), is applied onto an intermediate layer, and is subjected to heating and drying treatments at 70° C. for 5 minutes to form the recording layer 12Y having a thickness of 3 μm to be colored in the yellow color.

Next, a polyester aqueous solution is applied onto the recording layer Y, and thereafter, the resultant is dried to form the third layer 14C having a thickness of 3 Subsequently, a polyester aqueous solution having a low Young's modulus is applied onto the third layer 14C, and thereafter, the resultant is dried to form the second layer 14B having a thickness of 6 Next, a polyester aqueous solution is applied onto the second layer 14B, and thereafter, the resultant is dried to form the first layer 14A having a thickness of 3 μm.

Subsequently, 0.2 g of a leuco pigment (cyan color) represented by the above formula (3), 0.4 g of the color developing/quenching agent (alkyl salicylate) represented by the above formula (2), 0.01 g of a phthalocyanine-based photothermal conversion material B (absorption wavelength: 860 nm), and 0.8 g of a macromolecular material (poly(vinyl chloride-co-vinyl acetate(9:1))) are added to 8.8 g of a solvent (methyl ethyl ketone (MEK)), and the resultant is dispersed for 2 hours using a rocking mill to prepare a homogeneous dispersion liquid (coating B). The coating B is applied onto an intermediate layer, and is subjected to heating and drying treatments at 70° C. for 5 minutes to form the recording layer 12C having a thickness of 3 μm to be colored in the cyan color.

Next, a polyester aqueous solution is applied onto the recording layer C, and thereafter, the resultant is dried to form the third layer 13C having a thickness of 3 μm. Subsequently, a polyester aqueous solution having a low Young's modulus is applied onto the third layer 13C, and thereafter, the resultant is dried to form the second layer 13B having a thickness of 6 μm. Next, a polyester aqueous solution is applied onto the second layer 13B, and thereafter, the resultant is dried to form the first layer 13A having a thickness of 3 μm.

Subsequently, 0.23 g of the leuco pigment (magenta color) represented by the above formula (1), 0.4 g of the color developing/quenching agent (alkyl salicylate) represented by the above formula (2), 0.01 g of a phthalocyanine-based photothermal conversion material A (absorption wavelength: 915 nm), and 0.8 g of a macromolecular material (poly(vinyl chloride-co-vinyl acetate (9:1))) are added to 8.8 g of a solvent (methyl ethyl ketone (MEK)), and the resultant is dispersed for 2 hours using a rocking mill to prepare a homogeneous dispersion liquid (coating A). The coating A is applied onto an intermediate layer, and is subjected to heating and drying treatments at 70° C. for 5 minutes to form the recording layer 12M having a thickness of 3 μm to be colored in the magenta color.

Subsequently, an optical clear adhesive (OCA) is adhered onto the intermediate layer 13. Lastly, the stack provided on the temporary base for transfer is transferred to a housing to be the support base 11, thereby completing reversible recording medium 1 illustrated in FIG. 1.

It is to be noted that a method other than the above-described application may be used to form the recording layers 12M, 12C, and 12Y. For example, a film obtained by application to another substrate beforehand may be adhered onto the support base 11 via an adhesive film, for example, to form each of the recording layers 12M, 12C, and 12Y. Alternatively, the support base 11 may be immersed in the coating to form each of the recording layers 12M, 12C, and 12Y.

[1-3. Recording and Deletion Methods of Reversible Recording Medium]

It is possible for the reversible recording medium 1 according to the present embodiment to perform recording and deletion as follows, for example.

It is to be noted that description is given here of the recording layer 12 by exemplifying a case where, as described above, the recording layer 12M, the recording layer 12C, and the recording layer 12Y to be colored, respectively, in the cyan color, the magenta color, and the yellow color are stacked.

First, heating is performed at a temperature enough to cause the recording layer 12 (the recording layer 12M, the recording layer 12C, and the recording layer 12Y) to be decolored, e.g., at 120° C., and causes the recording layer 12 to be in a decolored state in advance. Next, an arbitrary part of the recording layer 12 is irradiated with an infrared ray having a wavelength and an output that are arbitrarily selected using, for example, a semiconductor laser, etc. Here, in a case where the recording layer 12M is caused to develop a color, irradiation is performed with the infrared ray of the wavelength Xi at energy enough to cause the recording layer 12M to reach a color-developing temperature. This allows for heating of the photothermal conversion material included in the recording layer 12M, causing a coloring reaction (chromogenic reaction) between the coloring compound and the color developing/quenching agent, thus allowing the irradiated part to develop the cyan color. Likewise, in a case where the recording layer 12C is caused to develop a color, irradiation is performed with the infrared ray of the wavelength $\lambda_2$ at energy enough to cause the recording layer 12C to reach a color-developing temperature. In a case where the recording layer 12Y is caused to develop a color, irradiation is performed with the infrared ray of the wavelength $\lambda_3$ at energy enough to cause the recording layer 12Y to reach a color-developing temperature. This allows for heating of each of the photothermal conversion materials included in the recording layer 12C and the recording layer 12Y, causing a coloring reaction between the coloring compound and the color developing/quenching agent, thus allowing the respective irradiated parts to develop the magenta color and the yellow color. In this manner, the irradiation of the respective arbitrary parts with the infrared rays of the corresponding wavelengths makes it possible to record information (e.g., a full-color image).

Meanwhile, in a case where the recording layer 12M, the recording layer 12C, and the recording layer 12Y subjected to the color development as described above are each decolored, irradiation is performed at energy enough to cause the infrared rays of the respective wavelengths corresponding to the layers 22, 23, and 24 to reach a decoloring temperature. This allows for heating of each of the photothermal conversion materials included in the recording layer 12M, the recording layer 12C, and the recording layer 12Y, causing a decoloring reaction between the coloring compound and the color developing/quenching agent, thus allowing the irradiated part to be decolored and leading to deletion of a record. Further, in a case of deleting all of records formed in the recording layer 12 all at once, the recording layer 12 is heated at a temperature enough to decolor all of the recording layer 12M, the recording layer 12C, and the recording layer 12Y, e.g., at 120° C. This allows information recorded in the recording layer 12 (the recording layer 12M, the recording layer 12C, and the recording layer 12Y) to be deleted all at once. Thereafter, the above-described operation is performed, thus enabling repeated recording into the recording layer 12.

It is to be noted that the color-developed state and the decolored state are kept insofar as the above-described chromogenic reaction and decoloring reaction such as the near infrared irradiation and the heating are not performed.

[1-4. Workings and Effects]

As described above, development has been in progress in a recording medium that is able to reversibly record and delete information by heat, that is, a so-called reversible recording medium, as an example of a display medium to be replaced with a printed matter, and proposed is a reversible recording medium that enables multicolor display in which an intermediate heat-insulating layer is stacked between a plurality of recording layers having different developed color tones.

As described above, in the reversible recording medium in which a plurality of recording layer is stacked with a heat-insulating layer interposed therebetween, it is desired to ameliorate deterioration of display quality due to unintended color mixture. There are two possible causes for occurrence of unintended color mixture. First, it is considered that a first cause is occurrence of defects in the intermediate heat-insulating layer, such as mixture of particles at the time of manufacturing the intermediate heat-insulating layer, pinholes generated in the application and drying processes, cracks generated at the time of winding the rolls. It is speculated that the defects in the intermediate heat-insulating layer cause coloring molecules in the recording layer to mix into another recording layer via the intermediate heat-insulating layer, resulting in the unintended color mixture. It is considered that a second cause is a decrease in heat-insulating effect caused by decreasing the thickness of the intermediate heat-insulating layer to prevent the occurrence of cracks of the first cause. Thus, it is speculated that the heat generated at the time of drawing on a desired recording layer is propagated to another recording layer, and unintended color mixture occurs.

In contrast, in the reversible recording medium 1 according to the present embodiment, the intermediate layers 13 and 14 each having a three-layer structure containing materials different from each other are respectively provided between the recording layers 12M and 12C to be colored in different colors, and between the recording layers 12C and 12Y to be colored in different colors. For example, among the first layer 13A, the second layer 13B, and the third layer 13C included in the intermediate layer 13, the second layer 13B provided between the first layer 13A and the third layer 13C includes a material having a lower Young's modulus than the other layers. The intermediate layer 14 is structured in the similar way as the intermediate layer 13. This allows reliability of the intermediate layers 13 and 14 to be improved. Specifically, by forming each of the second layers 13B and 14B using a material having a lower Young's modulus than materials included in the other layers, it becomes possible to alleviate the stress applied to each of the intermediate layers 13 and 14 and to reduce the generation of cracks.

As described above, in the reversible recording medium 1 according to the present embodiment, the intermediate layers 13 and 14 that are respectively provided between the recording layers 12M and 12C to be colored in different colors and between the recording layers 12C and 12Y to be colored in different colors each have a multilayer structure (e.g., three-layer structure), and the intermediate layers (the second layers 13B and 14B) disposed in the middle are each formed using a material having a lower Young's modulus than the other layers. As a result, it becomes possible to alleviate the stress applied to each of the intermediate layers 13 and 14 and to reduce the generation of cracks, thus makes it possible to reduce the occurrence of color mixture at the time of drawing. Therefore, it is possible to improve the display quality.

Next, description is given of modification examples 1 to 7 according to the present disclosure. In the following, components similar to those of the foregoing first embodiment are denoted by the same reference numerals, and descriptions thereof are omitted where appropriate.

2. Modification Examples

[2-1. Modification Example 1]

FIG. 2 is a cross-sectional view of a reversible recording medium (a reversible recording medium 2) according to a modification example (modification example 1) of the present disclosure. The reversible recording medium 2 includes, for example, the recording layer 12 that is disposed on the support base 11 and allows for reversible change between a recorded state and a deleted state, similarly to the foregoing embodiment. The reversible recording medium 2 according to the present modification example differs from the foregoing embodiment in that intermediate layers 23 and 24 each including a plurality of layers (three layers in this case) are respectively provided between the recording layers 12M and 12C and between the recording layers 12C and 12Y, and layers (second layers 23B and 24B) sandwiched between other layers (first layers 23A and 24A and third layers 23C and 24C) are each formed using a material having a higher barrier performance than the other layers.

The intermediate layers 23 and 24 serve to suppress diffusion of contained molecules and occurrence of heat transfer at the time of drawing, between the recording layer 12M and the recording layer 12C and between the recording layer 12C and the recording layer 12Y. The intermediate layer 23 has a configuration in which the first layer 23A, the second layer 23B, and the third layer 23C are stacked in this order, and the intermediate layer 24 similarly has a configuration in which the first layer 24A, the second layer 24B, and the third layer 24C are stacked in this order. Each of the layers 23A, 23B, and 23C(, 24A, 24B, and 24C) is formed using a typical macromolecular material having translucency, and in particular, it is preferable that the middle layers (the second layers 23B and 24B) in the above-mentioned multilayer structure be each formed using a material having a higher barrier performance than the other layers (the first layers 23A and 24A and the third layers 23C and 24C). Here, the high barrier performance means that transmittance of water or gas, for example, is low.

The first layers 23A and 24A and the third layers 23C and 24C are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Examples of the material of the second layers 23B and 24B include a metal material, an inorganic material, and layered nanocomposite material. Specific examples of the metal material include metal element such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum, titanium (Ti), bismuth (Bi), antimony (Sb), lead (Pb), or silicon (Si) or an alloy containing two or more of those. Examples of the inorganic material include an oxide material, a nitride material, an oxynitride material, and a carbide material, such as SiN, SiO, SiC, SiOC, SiCN, SiON, SiONC, AlO, and AlN. Examples of the layered nanocomposite material include kaolinite, nacrite, dickite, halloysite, hydrated halloysite, antigorite, chrysotile, pyrophyllite, montmorillonite, beidellite, saponite, hectorite, sauconite, stevensite, tetrasilylic mica, sodium taeniolite, muscovite, margarite, talc, vermiculite, phlogopite, xanthophyllite, chlorite, and scaly silica. The second layers 23B and 24B containing the above materials may be formed by, for example, a vacuum film-forming method such as a CVD method, a sputtering method, or a resistance heat deposition method. Further, the layers may also be formed by applying and baking a solution containing the above-mentioned material. In addition, the layers may be formed by transferring and laminating a barrier film containing the above-mentioned materials.

Combinations of materials included in the layers 23A, 23B, and 23C(, 24A, 24B, and 24C) are not limited as long as the materials of the second layers 23B and 24B each have a higher barrier performance than the materials of the first layers 23A and 24A and the third layers 23C and 24C. Further, for the intermediate layers 23 and 24, the above macromolecular materials may be crosslinked and used. In addition, the intermediate layers 23 and 24 may include various additive such as an ultraviolet absorbing agent, for example.

A thickness of each of the intermediate layers 23 and 24 is preferably more than or equal to 1 µm and less than or equal to 100 µm, for example, and more preferably more than or equal to 5 µm and less than or equal to 20 µm, for example. Among those, a thickness of each of the first layers 23A and 24A is preferably more than or equal to 1 µm and less than or equal to 10 µm, for example, and a thickness of each of the second layers 23B and 24B is preferably more than or equal to 0.01 µm and less than or equal to 10 µm, for example. A thickness of each of the third layers 23C and 24C is preferably more than or equal to 1 µm and less than or equal to 10 µm, for example.

As described above, in the present modification example, the intermediate layers 23 and 24 that are respectively provided between the recording layers 12M and 12C to be colored in different colors and between the recording layers 12C and 12Y to be colored in different colors each have a multilayer structure (e.g., three-layer structure), and the intermediate layers (the second layers 23B and 24B) disposed in the middle are each formed as a layer having a higher barrier performance than the other layers. As a result, diffusion of coloring molecules contained in the recording layers 12M, 12C, and 12Y via the intermediate layers 23 and 24 is suppressed and it becomes possible to decrease occurrence of color mixture at the time of drawing. Therefore, it is possible to improve the display quality.

[2-2. Modification Example 2]

FIG. 3 is a cross-sectional view of a reversible recording medium (a reversible recording medium 3) according to a modification example (modification example 2) of the present disclosure. The reversible recording medium 3 includes, for example, the recording layer 12 that is disposed on the support base 11 and allows for reversible change between a recorded state and a deleted state, similarly to the foregoing embodiment. The reversible recording medium 3 according to the present modification example differs from the foregoing embodiment in that intermediate layers 33 and 34 each including a plurality of layers (three layers in this case) are respectively provided between the recording layers 12M and 12C and between the recording layers 12C and 12Y, and layers (second layers 33B and 34B) sandwiched between other layers (first layers 33A and 34A and third layers 33C and 34C) are each formed using a material having a higher void percentage than the other layers.

The intermediate layers 33 and 34 serve to suppress diffusion of contained molecules and occurrence of heat transfer at the time of drawing, between the recording layer 12M and the recording layer 12C and between the recording layer 12C and the recording layer 12Y. The intermediate layer 33 has a configuration in which the first layer 33A, the second layer 33B, and the third layer 33C are stacked in this order, and the intermediate layer 34 similarly has a configuration in which the first layer 34A, the second layer 34B, and the third layer 34C are stacked in this order. Each of the layers 33A, 33B, and 33C(, 34A, 34B, and 34C) is formed using a typical macromolecular material having translucency, and in particular, it is preferable that the middle layers (the second layers 33B and 34B) in the above-mentioned multilayer structure be each formed using a material having a higher void percentage than the other layers (the first layers 33A and 34A and the third layers 33C and 34C).

The first layers 33A and 34A and the third layers 33C and 34C are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Examples of the material of the second layers 33B and 34B include a flexible polyurethane foam, a rigid polyurethane foam, a polystyrene foam, a polyethylene foam, a polypropylene foam, an EVA crosslinked foam, a PET resin foam, a phenol foam, a silicone foam, a polyvinyl chloride foam, a uria foam, an acrylic foam, a polyimide foam, a rubber foam, a polyethyleneterephthalate foam, a polycarbonate foam, a polyamide foam, and a polyacetal foam. In addition thereto, for example, a hollow body may be mixed to the base material to form a film at the time of forming the second layers 33B and 34B. Thus, porous second layers 33B and 34B are formed.

Combinations of materials included in the layers 33A, 33B, and 33C(, 34A, 34B, and 34C) are not limited as long as the materials of the second layers 33B and 34B each have a higher void percentage than the materials of the first layers 33A and 34A and the third layers 33C and 34C. Further, for the intermediate layers 33 and 34, the above macromolecular materials may be crosslinked and used. In addition, the intermediate layers 33 and 34 may include various additive such as an ultraviolet absorbing agent, for example.

A thickness of each of the intermediate layers 33 and 34 is preferably more than or equal to 1 μm and less than or equal to 100 μm, for example, and more preferably more than or equal to 3 μm and less than or equal to 10 μm, for example. Among those, a thickness of each of the first layers 33A and 34A is preferably more than or equal to 0.1 μm and less than or equal to 5 μm, for example, and a thickness of each of the second layers 33B and 34B is preferably more than or equal to 0.1 μm and less than or equal to 5 μm, for example. A thickness of each of the third layers 33C and 34C is preferably more than or equal to 0.1 μm and less than or equal to 5 μm, for example.

As described above, in the present modification example, the intermediate layers 33 and 34 that are respectively provided between the recording layers 12M and 12C to be colored in different colors and between the recording layers 12C and 12Y to be colored in different colors each have a multilayer structure (e.g., three-layer structure), and the intermediate layers (the second layers 33B and 34B) disposed in the middle are each formed as a layer that is more porous than the other layers. As a result, the intermediate layers 33 and 34 each become a porous layer having a high void percentage, and, for example, suppress the propagation of the heat generated at the time of drawing on a desired recording layer (e.g., the recording layer 12C) to the other recording layers (e.g., the recording layers 12M and 12Y), thus enable decrease in the occurrence of color mixture at the time of drawing. Therefore, it is possible to improve the display quality.

Further, in the present modification example, heat insulating properties of the intermediate layers 33 and 34 are enhanced, and this makes it possible to reduce the thicknesses of the intermediate layers 33 and 34. Therefore, it becomes possible to alleviate the stress applied to each of the intermediate layers 33 and 34 and to further reduce the generation of cracks.

FIG. 4 is a cross-sectional view of a reversible recording medium (a reversible recording medium 4) according to a modification example (modification example 3) of the present disclosure. The reversible recording medium 4 includes, for example, the recording layer 12 that is disposed on the support base 11 and allows for reversible change between a recorded state and a deleted state, similarly to the foregoing embodiment. The reversible recording medium 4 according to the present modification example differs from the foregoing embodiment in that intermediate layers 43 and 44 each including a plurality of layers (three layers in this case) are respectively provided between the recording layers 12M and 12C and between the recording layers 12C and 12Y, and layers (second layers 43B and 44B) sandwiched between other layers (first layers 43A and 44A and third layers 43C and 44C) are each formed using a material having a higher heat conductivity than the other layers.

The intermediate layers 43 and 44 serve to suppress diffusion of contained molecules and occurrence of heat transfer at the time of drawing, between the recording layer 12M and the recording layer 12C and between the recording layer 12C and the recording layer 12Y. The intermediate layer 43 has a configuration in which the first layer 43A, the second layer 43B, and the third layer 43C are stacked in this order, and the intermediate layer 44 similarly has a configuration in which the first layer 44A, the second layer 44B, and the third layer 44C are stacked in this order. Each of the layers 43A, 43B, and 43C(, 44A, 44B, and 44C) is formed using a typical macromolecular material having translucency, and in particular, it is preferable that the middle layers (the second layers 43B and 44B) in the above-mentioned multilayer structure be each formed using a material having a higher heat conductivity than the other layers (the first layers 43A and 44A and the third layers 43C and 44C).

The first layers 43A and 44A and the third layers 43C and 44C are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Examples of the material of the second layers 43B and 44B include a metal material, a metal oxide and a metal nitride, and an organic-based material. Specific examples of the metal material include metal element such as aluminum (Al), copper (Cu), silver (Ag), gold (Au), platinum (Pt), palladium (Pd), nickel (Ni), tin (Sn), cobalt (Co), rhodium (Rh), iridium (Ir), iron (Fe), ruthenium (Ru), osmium (Os), manganese (Mn), molybdenum (Mo), tungsten (W), niobium (Nb), tantalum, titanium (Ti), bismuth (Bi), antimony (Sb), lead (Pb), or silicon (Si) or an alloy containing two or more of those. Examples of the metal oxide and the metal nitride include indium tin oxide (ITO), zinc oxide, indium oxide, antimony-doped tin oxide, fluorine-doped tin oxide, aluminum-doped zinc oxide, gallium-doped zinc oxide, silicon-doped zinc oxide, zinc oxide-tin oxide-based material, indium oxide-tin oxide-based material, zinc oxide-indium oxide-magnesium oxide-based material, aluminum nitride, aluminum oxide, aluminum nitride oxide, magnesium oxide, crystalline silica, aluminum hydroxide, boron nitride, silicon nitride, silicon carbide, and beryllium oxide. Examples of the organic-based material include carbon black, carbon fiber, fullerene, graphene, carbon nanotube, carbon microcoil, nanohorn, substituted or unsubstituted polyaniline, polypyrrole, polythiophene, polyacetylene, and a (co)polymer including one or two selected from those. The second layers 43B and 44B may be formed by, for example, a vacuum film-forming method such as a CVD method, a sputtering method, or a resistance heat deposition method. Further, the above materials may be formed as it is or in the form of fine particles, lines, or needles, dispersed in a macromolecular material, and formed by an application method, for example. In addition, the layers may be formed by transferring and laminating a barrier film containing the above-mentioned materials.

Combinations of materials included in the layers 43A, 43B, and 43C(, 44A, 44B, and 44C) are not limited as long as the materials of the second layers 43B and 44B each have a higher heat conductivity than the materials of the first layers 43A and 44A and the third layers 43C and 44C. Further, for the intermediate layers 43 and 44, the above macromolecular materials may be crosslinked and used. In addition, the intermediate layers 43 and 44 may include various additive such as an ultraviolet absorbing agent, for example.

A thickness of each of the intermediate layers 43 and 44 is preferably more than or equal to 1 µm and less than or equal to 100 µm, for example, and more preferably more than or equal to 3 µm and less than or equal to 10 µm, for example. Among those, a thickness of each of the first layers 43A and 44A is preferably more than or equal to 1 µm and less than or equal to 5 µm, for example, and a thickness of each of the second layers 43B and 44B is preferably more than or equal to 0.01 µm and less than or equal to 5 µm, for example. A thickness of each of the third layers 43C and 44C is preferably more than or equal to 1 µm and less than or equal to 5 µm, for example.

As described above, in the present modification example, the intermediate layers 43 and 44 that are respectively provided between the recording layers 12M and 12C to be colored in different colors and between the recording layers 12C and 12Y to be colored in different colors each have a multilayer structure (e.g., three-layer structure), and the intermediate layers (the second layers 43B and 44B) disposed in the middle are each formed as a layer that has a higher heat conductivity than the other layers. As a result, the heat generated at the time of drawing on a desired recording layer (e.g., the recording layer 12C) is easily propagated in a planar direction in the second layers 43B and 44B, and the propagation in the stacking direction (to the other recording layers (e.g., the recording layers 12M and 12Y)) is suppressed. Therefore, it is possible to decrease the occurrence of color mixture at the time of drawing and to improve the display quality Further, in the present modification example, heat barrier properties of the intermediate layers 43 and 44 are enhanced, and this makes it possible to reduce the thicknesses of the intermediate layers 43 and 44. Therefore, it becomes possible to alleviate the stress applied to each of the intermediate layers 43 and 44 and to further reduce the generation of cracks.

[2-4. Modification Example 4]

FIG. 5 is a cross-sectional view of a reversible recording medium (reversible recording medium 5) according to a modification example (modification example 4) of the present disclosure. The reversible recording medium 5 includes, for example, the recording layer 12 that is disposed on the support base 11 and allows for reversible change between a recorded state and a deleted state, similarly to the foregoing embodiment. The reversible recording medium 5 according to the present modification example differs from the modification example 3 in that an intermediate layer 45 is added between the support base 11 and a recording layer 12 (here, the recording layer 12M).

The intermediate layer 45 has a configuration in which, for example, a second layer 45B and a third layer 45C are stacked in this order. The second layer 45B is formed using a material having a high heat conductivity, similarly to the second layers 43B and 44B according to the modification example 3, and the third layer 45C has a similar configuration as the third layers 43C and 44C according to the modification example 3. That is, the reversible recording medium 5 according to the present embodiment is formed by stacking, on the support base 11, the second layer 45B having a high heat conducting property and the third layer 45C formed by using a typical material in this order.

In this manner, in the present modification example, the second layer 45B having a high heat conductivity is provided between the support base 11 and the recording layer 12M. This decreases the propagation of the heat generated at the time of drawing on recording layer 12C, for example, thus enables to prevent deterioration in the display quality due to heat deformation of the support base 11. Further, material selectivity of the support base 11 improves.

[2-5. Modification Example 5]

FIG. 6 is a cross-sectional view of a reversible recording medium (a reversible recording medium 6) according to a modification example (modification example 5) of the present disclosure. The reversible recording medium 6 includes, for example, the recording layer 12 that is disposed on the support base 11 and allows for reversible change between a recorded state and a deleted state, similarly to the foregoing embodiment. The reversible recording medium 6 according to the present modification example has the intermediate layer 45 added, to the reversible recording medium 1 according to the above embodiment, between the support base 11 and the recording layer 12M, as in the modification example 4.

In this manner, the reversible recording medium according to the present disclosure may have a configuration in which the materials used for the second layers 13B, 14B, 23B, 24B, 33B, 34B, 43B, 44B, and 45B are different in properties from each other.

[2-6. Modification Example 6]

FIG. 7 is a cross-sectional view of a reversible recording medium (a reversible recording medium 7) according to a modification example (modification example 6) of the present disclosure. The reversible recording medium 7 includes, for example, the recording layer 12 that is disposed on the support base 11 and allows for reversible change between a recorded state and a deleted state, similarly to the foregoing embodiment. The reversible recording medium 7 according to the present modification example differs from the foregoing embodiment and the modification examples 1 to 5 in that all of layers (first layers 53A and 54A, second layers 53B and 54B, and third layers 53C and 54C), included in intermediate layers (heat-insulating layers 53 and 54) that are respectively provided between the recording layers 12M and 12C and between the recording layers 12C and 12Y, respectively include materials that are different from each other.

Specifically, the first layers 53A and 54A are each formed using a material having a higher barrier performance than the second layers 53B and 54B and the third layers 53C and 54C, for example. The second layers 53B and 54B are each formed using a material having a lower Young's modulus than the first layers 53A and 54A and the third layers 53C and 54C, for example. The third layers 53C and 54C each have a configuration similar to those of the third layers 13C and 14C according to the first embodiment.

In this manner, the reversible recording medium according to the present disclosure may have a configuration in which all the layers included in the intermediate layers respectively include materials that are different from each other. It is to be noted that, it is desirable to use a material that is less prone to diffuse into the recording layer 12, for each of the layers (e.g., the first layer and the second layer) that comes in direct contact to the recording layer 12.

[2-8. Modification Example 7]

FIG. 8 is a cross-sectional view of a reversible recording medium (a reversible recording medium 8) according to a modification example (modification example 7) of the present disclosure. The reversible recording medium 8 includes, for example, the recording layer 12 that is disposed on the support base 11 and allows for reversible change between a recorded state and a deleted state, similarly to the foregoing embodiment. The reversible recording medium 8 according to the present modification example have a configuration in which an intermediate layer 16 having a similar configuration as the intermediate layers 13 and 14 according to the foregoing embodiment is provided between the recording layer 12Y and the protective layer 15.

In this manner, the reversible recording medium according to the present disclosure may be provided with the intermediate layer 16 between the protective layer 15 and the recording layer 12 (the recording layer 12Y in FIG. 7) that is formed immediately beneath the protective layer 15. Thus, in addition to the effects of the foregoing embodiment, other effects of suppression of damage to the recording layer 12Y at the time of applying the protective layer 15 and suppression of heat deformation of the protective layer 15 due to heat generation at the time of drawing on the recording layer 12Y are achieved.

[2-8. Modification Example 8]

FIG. 9 is a cross-sectional view of a reversible recording medium (a reversible recording medium 9) according to a modification example (modification example 8) of the present disclosure. The reversible recording medium 9 includes, for example, a recording layer 62 that is disposed on the support base 11 and allows for reversible change between a recorded state and a deleted state, similarly to the foregoing embodiment. The reversible recording medium 9 according to the present modification example have a configuration in which the recording layer 62 including, for example, three types of coloring compounds to be colored in different colors is stacked between the intermediate layers 13 and 14 each having a configuration similar to the foregoing embodiment.

The recording layer 62 includes, as described above, three types of coloring compounds to be colored in different colors (e.g., the cyan color (C), the magenta color (M), and the yellow color (Y)). Specifically, the recording layer 62 is formed by, for example, manufacturing the three types of microcapsules 62C, 62M, and 62Y including respective coloring compounds to be colored in the cyan color (C), the magenta color (M), and the yellow color (Y), respective color developing/quenching agents corresponding to the coloring compounds, and respective photothermal conversion materials that absorb light in wavelength regions different from each other to generate heat, and mixing the resultant. The recording layer 62 may be formed, for example, by dispersing the above-described microcapsules 62C, 62M, and 62Y in a macromolecular material exemplified as the constituent material of the recording layer 12 according to the foregoing embodiment and applying the resultant dispersion onto the support base 11 over which the intermediate layer 13, for example, is formed.

As described above, in the foregoing embodiment and the modification examples 1 to 7, examples have been described in which layers (the recording layers 12M, 12C, and 12Y) to be colored in different colors are formed as the recording layer 12, and those layers are stacked via the intermediate layers (e.g., the intermediate layers 13 and 14); however, as in the present modification example, for example, the coloring compounds to be colored in the respective colors and materials corresponding the respective coloring compounds are enclosed in the respective microcapsules and the resultant is mixed, thereby achieving a reversible recording medium that enables full-color display even in the single-layer structure.

[2-9. Modification Example 9]

FIG. 10 is a cross-sectional view of a reversible recording medium (a reversible recording medium 10) according to a modification example (modification example 9) of the present disclosure. The reversible recording medium 10 includes, for example, the recording layer 12 that is disposed on the support base 11 and allows for reversible change between a recorded state and a deleted state, similarly to the foregoing embodiment, and includes intermediate layers 73 and 74 each including a plurality of layers (three layers in this case) are respectively provided between the recording layers 12M and 12C and between the recording layers 12C and 12Y. The reversible recording medium 10 according to the present modification example differs from the foregoing embodiment and the modification examples 1 to 8 in that, among the three layers included in each of the intermediate layers 73 and 74, layers (second layers 73B and 74B) sandwiched between other layers (first layers 73A and 74A and third layers 73C and 74C) are each formed using a material having a lower cure shrinkage rate than the other layers.

The intermediate layers 73 and 74 serve to suppress diffusion of contained molecules and occurrence of heat transfer at the time of drawing, between the recording layer 12M and the recording layer 12C and between the recording layer 12C and the recording layer 12Y. The intermediate layer 73 has a configuration in which the first layer 73A, the second layer 73B, and the third layer 73C are stacked in this order, and the intermediate layer 74 similarly has a configuration in which the first layer 74A, the second layer 74B, and the third layer 74C are stacked in this order. Each of the layers 73A, 73B, and 73C(, 74A, 74B, and 74C) is formed using a typical macromolecular material having translucency, and in particular, it is preferable that the middle layers (the second layers 73B and 74B) in the above-mentioned multilayer structure be each formed using a material having a lower cure shrinkage rate than the other layers (the first layers 73A and 74A and the third layers 23C and 24C).

The first layers 73A and 74A, the second layers 73B and 74B, and the third layers 73C and 74C are each configured, for example, using a typical macromolecular material having translucency. Specific examples of the material include polyvinyl chloride, polyvinyl acetate, a vinyl chloride-vinyl acetate copolymer, ethyl cellulose, polystyrene, a styrene-based copolymer, a phenoxy resin, polyester, aromatic polyester, polyurethane, polycarbonate, a polyacrylic ester, a polymethacrylic ester, an acrylic-based copolymer, a maleic acid-based polymer, a cycloolefin copolymer, polyvinylalcohol, modified polyvinylalcohol, polyvinylbutyral, polyvinylphenol, polyvinylpyrrolidone, hydroxyethyl cellulose, carboxymethyl cellulose, starch, a phenol resin, an epoxy resin, a melamine resin, a urea resin, an unsaturated polyester resin, an alkyd resin, a urethane resin, a polyarylate resin, polyimide, polyamide, and polyamide-imide.

Of the above materials, a material having a lower cure shrinkage rate than the first layers 73A and 74A and the third layers 73C and 74C is selected for each of the second layers 73B and 74B, and a material having a higher cure shrinkage rate than the second layers 73B and 74B is selected for each of the first layers 73A and 74A and the third layers 73C and 74C. Combinations of materials included in the layers 73A, 73B, and 73C(, 74A, 74B, and 74C) are not limited as long as the materials of the second layers 73B and 74B each have a lower cure shrinkage rate than the materials of the other layers 73A, 74A, 73C, and 74C. Further, for the intermediate layers 73 and 74 the above macromolecular materials may be crosslinked and used. In addition, the intermediate layers 73 and 74 may include various additive such as an ultraviolet absorbing agent, for example.

A thickness of each of the intermediate layers 73 and 74 is preferably more than or equal to 1 µm and less than or equal to 100 µm, for example, and more preferably more than or equal to 5 µm and less than or equal to 20 µm, for example. Among those, a thickness of each of the first layers 73A and 74A is preferably more than or equal to 0.1 µm and less than or equal to 10 µm, for example, and a thickness of each of the second layers 73B and 74B is preferably more than or equal to 0.01 µm and less than or equal to 10 µm, for example. A thickness of each of the third layers 73C and 74C is preferably more than or equal to 0.1 µm and less than or equal to 10 µm, for example.

As described above, in the present modification example, the intermediate layers 73 and 74 that are respectively provided between the recording layers 12M and 12C to be colored in different colors and between the recording layers 12C and 12Y to be colored in different colors each have a multilayer structure (e.g., three-layer structure), and the intermediate layers (second layers 73B and 74B) disposed in the middle are each formed as a layer having a lower cure shrinkage rate than the other layers. As a result, generation of a crack caused by residual stress attributed to the cure shrinkage that occurs at the time of drying the intermediate layer is suppressed and it becomes possible to decrease occurrence of color mixture via the crack. Therefore, it is possible to improve the display quality.

3. Application Example

Next, description is given of application examples of the reversible recording mediums (e.g., the reversible recording mediums 1 to 10) described in the foregoing embodiment and the modification examples 1 to 9. However, a configuration of an electronic apparatus described below is merely exemplary, and the configuration may be varied appropriately. Any of the reversible recording mediums 1 to 10 is applicable to a portion of various electronic apparatuses or various clothing accessories. For example, the reversible recording mediums 1 to 10 is applicable to a portion of clothing accessories such as a watch (wristwatch), a bag, clothes, a hat, a helmet, headphones, glasses, and shoes, as a so-called wearable terminal. In addition, the type of the electronic apparatus is not particularly limited, and examples include a wearable display such as a head-up display or a head-mounted display, a portable device such as a portable music player or a portable game machine, a robot, a refrigerator, a washing machine, and the like. Further, it is also possible to apply, not only to the electronic apparatuses or the clothing accessories, but also to, as decorative members, the interior and exterior of automobiles, the interior and exterior of walls and the like of buildings, the exterior of furniture such as desks, and the like.

[Application Example 1]

FIGS. 11A and 11B each illustrate an appearance of an integrated circuit (IC) card with a rewritable function. The IC card has a card surface that serves as a printing surface 110, and includes, for example, a sheet-shaped reversible recording medium 1, etc. that is adhered thereto. The IC card allows for drawing on the printing surface 110 as well as rewriting and deletion thereof appropriately by disposing the reversible recording medium 1, etc. on the printing surface, as illustrated in FIGS. 10A and 10B.

[Application Example 2]

FIG. 12A illustrates a configuration of an appearance of a front surface of a smartphone, and FIG. 12B illustrates a configuration of an appearance of a rear surface of the smartphone illustrated in FIG. 12A. The smartphone includes, for example, a display part 210, a non-display part 220, and a casing 230. An entire surface, for example, of the casing 230 on side of the rear surface is provided with, for example, the reversible recording medium 1, etc. as the exterior member of the casing 230. This allows for display of various color patterns as illustrated in FIG. 12B. It is to be noted that, although the smartphone is exemplified here, this is not limitative; it is also possible to apply, for example, to a notebook personal computer (PC), a tablet PC, or the like.

[Application Example 3]

FIGS. 13A and 13B each illustrate an appearance of a bag. The bag includes a storing part 310 and a handle 320, for example, and the reversible recording medium 1, for example, is attached to the storing part 310. Various letters and patterns are displayed on the storing part 310 by means of the reversible recording medium 1, for example. The attachment of the reversible recording medium 1, etc. to a part of the handle 320 allows for display of various color patterns, and allows for change in design of the storing part 310, as illustrated, from the example of FIG. 13A to the example of FIG. 13B. It is also possible, for the purpose of fashion, to achieve a useful electronic device.

[Application Example 4]

FIG. 14 illustrates a configuration example of a wristband able to record, in an amusement park, attraction-riding history, schedule information, and the like, for example. The wristband includes belt parts 411 and 412 and an information recording part 420. The belt parts 411 and 412 have a band shape, for example, and respective ends (unillustrated) thereof are configured to be connectable to each other. The reversible recording medium 1, etc., for example, is adhered to the information recording part 420, and attraction-riding history MH2 and schedule information IS (IS1 to IS3) as described above and an information code CD, for example, are recorded. In the amusement park, a visitor is able to record the above-described information by waving the wristband over a drawing apparatus installed at every location of attraction-riding reservation spots.

A riding history mark MH1 indicates the number of attractions ridden by a visitor who wears the wristband in the amusement park. In this example, as the visitor rides the more attractions, the more star-shaped marks are recorded as the riding history mark MH1. It is to be noted that this is not limitative; for example, the color of the mark may be changed in accordance with the number of attractions ridden by the visitor.

The schedule information IS in this example indicates a schedule of the visitor. In this example, information about all of events including an event reserved by the visitor and an event to be held in the amusement park is recorded as the schedule information IS1 to IS3. Specifically, in this example, a title of an attraction (an attraction 201) of which riding reserved by the visitor and scheduled time of the riding are recorded as the schedule information IS1. Further, an event such as a parade in the park and its scheduled starting time are recorded as the schedule information IS2.

Furthermore, a restaurant reserved beforehand by a visitor and its scheduled mealtime are recorded as the schedule information IS3.

The information code CD records, for example, identification information IID that is used to identify the wristband and website information IWS.

[Application Example 5]

FIG. 15A illustrates an appearance of an upper surface of an automobile, and FIG. 15B illustrates an appearance of a side surface of the automobile. The reversible recording medium 1 or the like according to the present disclosure, as described above, may be provided, for example, to a vehicle body such as a bonnet 511, a bumper 512, a roof 513, a trunk cover 514, a front door 515, a rear door 516, or a rear bumper 517, thereby enabling various information and color patterns to be displayed in each part. The reversible recording medium 1 or the like is provided on the interior of the automobile, for example, on a steering wheel, a dashboard, or the like, thereby enabling various colors to be displayed.

Although the present disclosure has been described above with reference to the embodiment and the modification examples 1 to 9, the present disclosure is not limited to aspects described in the foregoing embodiments, etc., and may be modified in a variety of ways. For example, not all the components described in the foregoing embodiments, etc. may necessarily be provided, and any other component may be further included. Moreover, the materials and the thicknesses of the above-described components are merely examples, and are not limited to those described herein. In addition, the modification examples 1 to 8 may be combined with each other.

Further, although the foregoing modification example 8 gives an example where the microcapsule is used to perform full-color display in the single-layer structure, this is not limitative; for example, it is also possible to use a fiber-shaped three-dimensional stereoscopic structure to perform the full-color display. For example, the fiber to be used here preferably has a so-called core-sheath structure configured by a core part that includes the coloring compound to be colored in a desired color, the color developing/quenching agent corresponding thereto, and the photothermal conversion material, and by a sheath part that coats the core part and is configured by a heat-insulating material. By forming the three-dimensional stereoscopic structure using a plurality of types of fibers having the core-sheath structure and including respective coloring compounds to be colored in different colors, it becomes possible to produce a reversible recording medium that enables full-color display.

Furthermore, although the foregoing embodiments, etc. give an example where the laser is used to perform color development and decoloring of recording layers, this is not limitative. For example, a thermal head may also be used to perform the color development and the decoloring.

It is to be noted that the effects described in the present specification are merely exemplary and not limitative, and may have other effects.

It is to be noted that the present disclosure may have the following configurations.

(1)

A reversible recording medium including:
 a first recording layer to be colored in a first color;
 a second recording layer to be colored in a second color, the second color being different from the first color; and
 a first intermediate layer provided between the first recording layer and the second recording layer, the first intermediate layer including a plurality of layers respectively containing materials different from each other.

(2)

The reversible recording medium according to (1), in which the first intermediate layer including the plurality of layers contains materials respectively having Young's moduli different from each other.

(3)

The reversible recording medium according to (1) or (2), in which
 the first intermediate layer has a multilayer structure in which a first layer, a second layer, and a third layer are stacked in this order, and
 the second layer contains a material having a lower Young's modulus than materials contained in the first layer and the third layer.

(4)

The reversible recording medium according to any one of (1) to (3), in which the first intermediate layer including the plurality of layers contains materials respectively having cure shrinkage rates different from each other.

(5)

The reversible recording medium according to any one of (1) to (4), in which
 the first intermediate layer has a multilayer structure in which a first layer, a second layer, and a third layer are stacked in this order, and
 the second layer contains a material having a lower cure shrinkage rate than materials contained in the first layer and the third layer.

(6)

The reversible recording medium according to any one of (1) to (5), in which the first intermediate layer including the plurality of layers contains materials respectively having barrier performances different from each other.

(7)

The reversible recording medium according to any one of (1) to (6), in which
 the first intermediate layer has a multilayer structure in which a first layer, a second layer, and a third layer are stacked in this order, and
 the second layer contains a material having a higher barrier performance than materials contained in the first layer and the third layer.

(8)

The reversible recording medium according to any one of (1) to (7), in which the first intermediate layer including the plurality of layers contains materials respectively having heat conductivities different from each other.

(9)

The reversible recording medium according to any one of (1) to (8), in which
 the first intermediate layer has a multilayer structure in which a first layer, a second layer, and a third layer are stacked in this order, and
 the second layer contains a material having a higher heat conductivity than materials contained in the first layer and the third layer.

(10)

The reversible recording medium according to any one of (1) to (8), in which
 the first intermediate layer has a multilayer structure in which a first layer, a second layer, and a third layer are stacked in this order, and
 the second layer contains a material having a lower heat conductivity than materials contained in the first layer and the third layer.

(11)

The reversible recording medium according to (10), in which the second layer contains a foam material.

(12)

The reversible recording medium according to (10), in which the second layer contains a hollow body inside the second layer.

(13)

The reversible recording medium according to any one of (1) to (12), in which the first recording layer, the first intermediate layer, and the second recording layer are stacked in this order over a support base, and the reversible recording medium includes a second intermediate layer between the support base and the first recording layer.

(14)

The reversible recording medium according to (13), in which the second intermediate layer has a configuration similar to the first intermediate layer.

(15)

The reversible recording medium according to any one of (1) to (14), further including:

a protective layer over the second recording layer; and a third intermediate layer between the second recording layer and the protective layer.

(16)

The reversible recording medium according to (15), in which the third intermediate layer has a configuration similar to the first intermediate layer.

(17)

The reversible recording medium according to any one of (1) to (16), in which the first recording layer and the second recording layer each include a coloring compound, a color developing/quenching agent, and a photothermal conversion agent.

(18)

The reversible recording medium according to (17), in which the coloring compound included in the first recording layer and the coloring compound included in the second recording layer are to be colored in different colors.

(19)

The reversible recording medium according to (17) or (18), in which the photothermal conversion agent included in the first recording layer and the photothermal conversion agent included in the second recording layer absorb respective infrared rays having different wavelength regions and generate heat.

(20)

The reversible recording medium according to any one of (1) to (19), in which the first recording layer and the second recording layer each reversibly change between a recorded state and a deleted state.

(21)

The reversible recording medium according to any one of (1) to (20), further including a third recording layer to be colored in a third color that is different from colors in which the first recording layer and the second recording layer are to be colored, in which the first recording layer, the second recording layer, and the third recording layer are stacked in this order, and the first intermediate layer is provided each of between the first recording layer and the second recording layer and between the second recording layer and the third recording layer.

(22)

An exterior member having at least one surface provided with a reversible recording medium over a support substrate, the reversible recording medium including, as a recording layer that reversibly changes between a recorded state and a deleted state:

a first recording layer to be colored in a first color;

a second recording layer to be colored in a second color, the second color being different from the first color; and a first intermediate layer provided between the first recording layer and the second recording layer, the first intermediate layer including a plurality of layers respectively containing materials different from each other.

This application claims the benefit of Japanese Priority Patent Application JP2017-243581 filed with the Japan Patent Office on Dec. 20, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reversible recording medium comprising:

a first recording layer to be colored in a first color;

a second recording layer to be colored in a second color, the second color being different from the first color; and a first intermediate layer provided between the first recording layer and the second recording layer, the first intermediate layer including a plurality of layers respectively containing materials different from each other, wherein the plurality of layers of the first intermediate layer including a multilayer structure in which a first layer, a second layer, and a third layer are stacked in order, the second layer having a lower heat conductivity than the first layer and the third layer, and the second layer contains a foam material.

2. The reversible recording medium according to claim 1, wherein the second layer contains a hollow body inside the second layer.

3. The reversible recording medium according to claim 1, wherein the first recording layer, the first intermediate layer, and the second recording layer are stacked in this order over a support base, and the reversible recording medium comprises a second intermediate layer between the support base and the first recording layer.

4. The reversible recording medium according to claim 3, wherein the second intermediate layer including a multilayer structure in which a first layer, a second layer, and a third layer are stacked in order, wherein the second layer having a lower heat conductivity than the first layer and the third layer, and wherein the second layer contains a foam material.

5. The reversible recording medium according to claim 4, further comprising:

a protective layer over the second recording layer; and a third intermediate layer between the second recording layer and the protective layer.

6. The reversible recording medium according to claim 5, wherein the third intermediate layer including a multilayer structure in which a first layer, a second layer, and a third layer are stacked in order, wherein the second layer having a lower heat conductivity than the first layer and the third layer, and wherein the second layer contains a foam material.

7. The reversible recording medium according to claim 1, wherein the first recording layer and the second recording layer each include a coloring compound, a color developing/quenching agent, and a photothermal conversion agent.

8. The reversible recording medium according to claim 1, wherein the first recording layer and the second recording layer each reversibly change between a recorded state and a deleted state.

9. The reversible recording medium according to claim 1, further comprising
a third recording layer to be colored in a third color that is different from colors in which the first recording layer and the second recording layer are to be colored, wherein
the first recording layer, the second recording layer, and the third recording layer are stacked in this order, and the first intermediate layer is provided between the first recording layer and the second recording layer.

10. The reversible recording medium according to claim 1, further comprising
a third recording layer to be colored in a third color that is different from colors in which the first recording layer and the second recording layer are to be colored, wherein
the first recording layer, the second recording layer, and the third recording layer are stacked in this order, and the first intermediate layer is provided between the second recording layer and the third recording layer.

11. An exterior member comprising a support substrate and a reversible recording medium on at least one surface of the support substrate,
the reversible recording medium comprising, as a recording layer that reversibly changes between a recorded state and a deleted state:
a first recording layer to be colored in a first color;
a second recording layer to be colored in a second color, the second color being different from the first color; and
a first intermediate layer provided between the first recording layer and the second recording layer, the first intermediate layer including a plurality of layers respectively containing materials different from each other,
wherein
the plurality of layers of the first intermediate layer including a multilayer structure in which a first layer, a second layer, and a third layer are stacked in order,
the second layer having a lower heat conductivity than the first layer and the third layer, and
the second layer contains a foam material.

* * * * *